(12) United States Patent
Wengerter et al.

(10) Patent No.: US 9,986,550 B2
(45) Date of Patent: *May 29, 2018

(54) CONFIGURATION OF CONTROL CHANNELS IN A MOBILE COMMUNICATION SYSTEM

(71) Applicant: Panasonic Corporation, Osaka (JP)

(72) Inventors: Christian Wengerter, Kleinheubach (DE); Hidetoshi Suzuki, Kanagawa (JP); Akihiko Nishio, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/458,672

(22) Filed: Mar. 14, 2017

(65) Prior Publication Data

US 2017/0188345 A1 Jun. 29, 2017

Related U.S. Application Data

(63) Continuation of application No. 14/984,570, filed on Dec. 30, 2015, now Pat. No. 9,648,606, which is a
(Continued)

(30) Foreign Application Priority Data

Jan. 9, 2007 (EP) .................................. 07000351

(51) Int. Cl.
*H04B 7/216* (2006.01)
*H04W 72/04* (2009.01)
(Continued)

(52) U.S. Cl.
CPC ........ *H04W 72/042* (2013.01); *H04B 7/0413* (2013.01); *H04L 1/001* (2013.01); *H04L 1/0004* (2013.01)

(58) Field of Classification Search
CPC ..................................................... H04W 72/12
(Continued)

(56) References Cited

U.S. PATENT DOCUMENTS 6,512,779 B1 1/2003 Vollmer et al.
2002/0138721 A1 9/2002 Kwon et al.
(Continued)

FOREIGN PATENT DOCUMENTS

DE 19856043 A1 7/2000
EP 0998069 A2 5/2000
(Continued)

OTHER PUBLICATIONS

3GPP TS 25.308 V5.3.0, "3rd Generation Partnership Project; Technical Specification Group Radio Access Network; High Speed Downlink Packet Access (HSDPA); Overall description; Stage 2 (Release 5)," Dec. 2002, 29 pages.
(Continued)

*Primary Examiner* — Shripal Khajuria
(74) *Attorney, Agent, or Firm* — Seed IP Law Group LLP

(57) ABSTRACT

The invention relates to a method, apparatus and system for configuring control channels in a mobile communication network and a mobile station. In order to suggest another improved scheme for configuring control channels, in particular control channels related to the transmission of user data the invention suggests aligning the size of the control channel information of different formats to an equal number of coded control channel information bits and/or modulation symbols for each control channel. The control channels may comprise scheduling related control information. According to another aspect of the invention, the size of the control channel information is aligned by means of modulation and/or coding, however the control channel information is aligned to one out of a set of numbers of coded control
(Continued)

channel information bits and/or modulation symbols for each control channel.

11 Claims, 16 Drawing Sheets

Related U.S. Application Data continuation of application No. 13/928,023, filed on Jun. 26, 2013, now Pat. No. 9,338,792, which is a continuation of application No. 12/522,539, filed as application No. PCT/EP2007/010755 on Dec. 10, 2007, now Pat. No. 8,619,719.

(51) Int. Cl.
 *H04B 7/0413* (2017.01)
 *H04L 1/00* (2006.01)

(58) Field of Classification Search
 USPC .......................................................... 370/335
 See application file for complete search history.

(56) References Cited

U.S. PATENT DOCUMENTS

| | | |
|---|---|---|
| 2003/0086384 A1 | 5/2003 | Kwon et al. |
| 2003/0123470 A1 | 7/2003 | Kim et al. |
| 2003/0147422 A1 | 8/2003 | You et al. |
| 2004/0005906 A1 | 1/2004 | Okumura et al. |
| 2004/0081131 A1 | 4/2004 | Walton et al. |
| 2005/0226342 A1 | 10/2005 | Alajaji et al. |
| 2006/0205413 A1 | 9/2006 | Teague |
| 2006/0291403 A1 | 12/2006 | Kahtava et al. |
| 2007/0081602 A1 | 4/2007 | Tanaka et al. |
| 2007/0149132 A1 | 6/2007 | Li et al. |
| 2008/0160951 A1 | 7/2008 | Dominique et al. |

FOREIGN PATENT DOCUMENTS

| | | |
|---|---|---|
| EP | 1134926 A2 | 9/2001 |
| JP | 2006504367 A | 2/2006 |
| RU | 2 221 343 C2 | 1/2004 |
| WO | 99/65171 A1 | 12/1999 |
| WO | 0035137 A2 | 6/2000 |
| WO | 01/24566 A1 | 4/2001 |

OTHER PUBLICATIONS

3GPP TS 25.212 V7.1.0, "3rd Generation Partnership Project; Technical Specification Group Radio Access Network; Multiplexing and channel coding (FDD) (Release 7)," Jun. 2006, 84 pages.
3GPP TR 25.814 V7.1.0, "3rd Generation Partnership Project; Technical Specification Group Radio Access Network; Physical layer aspects for evolved Universal Terrestrial Radio Access (UTRA) (Release 7)," Sep. 2006, 132 pages.
3GPP TS 36.211 V0.2.1, 3rd Generation Partnership Project; Technical Specification Group Radio Access Network; Physical Channels and Modulation (Release 8), Nov. 2006, 28 pages.
English Translation of Official Decision on Grant dated Jan. 15, 2015, for corresponding RU Application No. 2011132824/08(048426), 6 pages.
European Search Report dated Jun. 7, 2007, for corresponding EP Application No. 07000351, 3 pages.
International Search Report dated Sep. 2, 2008, for corresponding International Application No. PCT/EP2007/010755, 3 pages.
Japanese Office Action for corresponding JP Application No. 2009-545091, dated Jan. 17, 2012, 7 pages. (With English Translation).
Japanese Office Action for corresponding JP Application No. 2011-253211, dated Jan. 17, 2012, 7 pages. (With English Translation).
Japanese Office Action dated Sep. 24, 2013, for corresponding JP Application No. 2012-060612, 6 pages. (With English Translation).
NTT DoCoMo, Fujitsu, Mitsubishi Electric, NEC, Sharp, Toshiba Corporation, "Coding Scheme of L1/L2 Control Channel for E-UTRA Downlink," R1-061672, 3GPP TSG RAN WG1 LTE Ad Hoc, Agenda Item: 6.3.2, Cannes, France, Jun. 27-30, 2006, pp. 1-19.
NTT DoCoMO, Ericsson, Fujitsu, Mitsubishi Electric, NEC, Panasonic, Sharp, Toshiba Corporation, "Comparison between RB-level and Sub-carrier-level Distributed Transmission for Shared Data Channel in E-UTRA Downlink," R1-062089 (Original: R1-061182), 3GPP TSG RAN WG1 Meeting #46, Agenda Item: 8.2, Tallinn, Estonia, Aug. 28-Sep. 1, 2006, pp. 1-14.
Panasonic, "PDCCH payload formats, sizes and CCE aggregation," R1-074906, 3GPP TSG-RAN WG1 Meeting #51, Agenda Item: 6.2.3, Jeju, Korea, Nov. 5-9, 2007, 6 pages.
Qualcomm Europe, "Further details on HS-SCCH-less operation for VoIP traffic," R1-060450, 3GPP TSG-RAN WG1 #44, Agenda Item: 10, Denver, USA, Feb. 13-17, 2006, 7 pages.
Qualcomm Europe, "Further Evaluation of HS-SCCH-less operation," R1-060944, 3GPP TSG-RAN WG1 #44bis, Agenda Item: 9, Athens, Greece, Mar. 27-31, 2006, 8 pages.

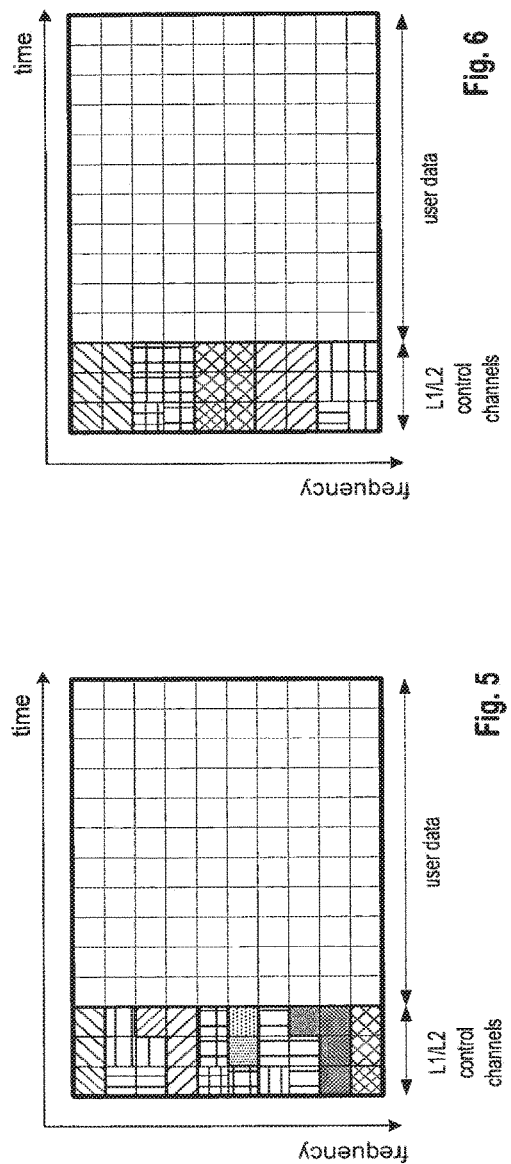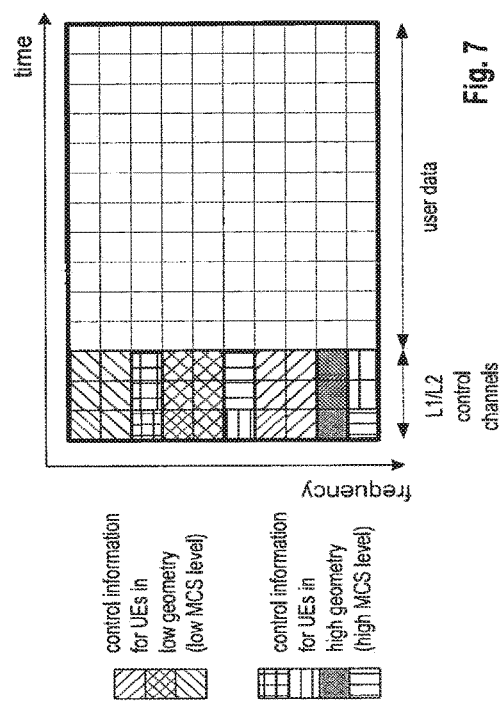

CONFIGURATION OF CONTROL CHANNELS IN A MOBILE COMMUNICATION SYSTEM

BACKGROUND

Technical Field

The invention relates to a method, apparatus and system for configuring control channels in a mobile communication network and a mobile station.

Description of the Related Art

Packet-Scheduling and Shared Channel Transmission

In wireless communication systems employing packet-scheduling, at least part of the air-interface resources are assigned dynamically to different users (mobile stations—MS). Those dynamically allocated resources are typically mapped to at least one shared data channel (SDCH). A shared data channel may, for example, have one of the following configurations:
- One or multiple codes in a CDMA (Code Division Multiple Access) system are dynamically shared between multiple MS.
- One or multiple subcarriers (subbands) in an OFDMA (Orthogonal Frequency Division Multiple Access) system are dynamically shared between multiple MS.
- Combinations of the above in an OFCDMA (Orthogonal Frequency Code Division Multiplex Access) or a MC-CDMA (Multi Carrier-Code Division Multiple Access) system are dynamically shared between multiple MS.

The main benefits of packet-scheduling are the multi-user diversity gain by time domain scheduling (TDS) and dynamic user rate adaptation.

Assuming that the channel conditions of the users change over time due to fast (and slow) fading, at a given time instant the scheduler can assign available resources (codes in case of CDMA, subcarriers/subbands in case of OFDMA) to users having good channel conditions in time domain scheduling.

Specifics of DRA and Shared Channel Transmission in OFDMA

Additionally to exploiting multi-user diversity in time domain by Time Domain Scheduling (TDS), in OFDMA multi-user diversity can also be exploited in frequency domain by Frequency Domain Scheduling (FDS). This is because the OFDM signal is in frequency domain constructed out of multiple narrowband subcarriers (typically grouped into subbands), which can be assigned dynamically to different users. By this, the frequency selective channel properties due to multi-path propagation can be exploited to schedule users on frequencies (subcarriers/subbands) on which they have a good channel quality (multi-user diversity in frequency domain).

As briefly introduced earlier in real systems the OFDM (A) physical resources (subcarriers in frequency domain and OFDM symbols in time domain) are defined in terms of subbands in frequency domain and slots, sub-frames, etc. in time domain. For exemplary reasons, in the following description the following definition is used (see also 3GPP TS 36.211 V0.2.1, "Physical Channels and Modulation (Release 8)," November 2006, available at http://www.3gpp.org and incorporated herein by reference):
- A slot is defined in time domain and spans over $N_{sym}$ consecutive OFDM symbols
- A sub-frame is defined in time domain and spans over $N_{slot}$ consecutive slots
- A frame is defined in time domain and spans over $N_{sf}$ consecutive sub-frames
- A resource element (RE) defines the resource of one OFDM symbol in time domain and one subcarrier in frequency domain, which defines one modulation symbol
- A subband is defined in frequency domain and spans over $N_{sc}$ consecutive subcarriers
- A physical resource block (PRB) spans over one subband and one slot and contains $N_{sym} \times N_{sc}$ resource elements
- A virtual resource block (VRB) has the same size as a PRB in terms of resource elements, but has no relation to the mapping on the physical resources FIG. 3 shows an exemplary downlink resource grid of an OFDMA channel by means of which the structure of the resource blocks will be explained in further detail. For exemplary purposes, a frame structure as, for example, proposed in 3GPP TR 25.814, "Physical layer aspects for evolved Universal Terrestrial Radio Access (UTRA), (Release 7)," version 7.1.0, September 2006 (available at http://www.3gpp.org and incorporated herein by reference) or 3GPP TS 36.211 is assumed.

Accordingly a frame may, for example, have a length (in the time domain) of 10 ms consisting of 10 sub-frames of 1.0 ms length. Each sub-frame may be divided in two slots each comprising a given number of $N_{symb}^{DL}=7$ OFDM symbols in the time domain and spanning the entire downlink channel bandwidth available (i.e., all $N_{BW}^{DL}$ subcarriers into which the downlink channel bandwidth is divided). Each of the OFDM symbols consists of $N_{BW}^{DL}$ modulation symbols or resource elements.

As illustrated in FIG. 3, a resource block is formed by a given number of resource elements or modulation symbols in a frequency range (specified by the bandwidth of $N_{RB}$ subcarriers) and a given number of OFDM symbols in the time domain (or more precisely the modulation symbols of the given number of OFDM symbols in a frequency range defined by the bandwidth of $N_{RB}$ subcarriers). Thereby, a resource block may have the length of a sub-frame or a slot of the sub-frame in the time domain. Further, it may be assumed that a given number of resource elements in a resource block (corresponding to a given number of modulation symbols of $N_{sym}^{L1/L2}$ OFDM symbols in a resource block) are reserved for control signaling while the remaining resource elements are used for user data.

For the 3GPP Long Term Evolution (see 3GPP TR 25.814), a 10 MHz system (normal cyclic prefix) may consist of 600 subcarriers with a subcarrier spacing of 15 kHz. The 600 subcarriers may then be grouped into 50 subbands (12 adjacent subcarriers), each subband occupying a bandwidth of 180 kHz. Assuming that a slot has a duration of 0.5 ms, a resource block (RB) spans over 180 kHz and 0.5 ms according to this example.

A number of physical channels and also reference signals will be mapped onto the physical resources (REs, PRBs). In the following, we will focus on the Shared Data CHannel (SDCH) and the L1/L2 control channels, which carry layer 1 and layer 2 control information for the data on the SDCH. For simplicity reasons the mapping of other channels and reference signals is not considered.

Typically, a physical resource block is the smallest physical allocation unit on which the SDCH is mapped. In case virtual resource blocks are defined, an SDCH might be mapped onto a virtual resource block first and a virtual resource block might then be mapped either on a single physical resource block (localized mapping) or might be distributed onto multiple physical resource blocks (distributed mapping).

In order to exploit multi-user diversity and to achieve scheduling gain in frequency domain, the data for a given user should be allocated on physical resource blocks on which the users have a good channel condition (localized mapping).

An example for a localized mapping is shown in FIG. 1, where one sub-frame spans over one slot. In this example neighboring physical resource blocks are assigned to four mobile stations (MS1 to MS4) in the time domain and frequency domain.

Alternatively, the users may be allocated in a distributed mode (DM) as shown in FIG. 2. In this configuration a user (mobile station) is allocated on multiple resource blocks, which are distributed over a range of resource blocks. In distributed mode a number of different implementation options are possible. In the example shown in FIG. 2, a pair of users (MSs 1/2 and MSs 3/4) share the same resource blocks. Several further possible exemplary implementation options may be found in 3GPP RAN WG#1 Tdoc R1-062089, "Comparison between RB-level and Sub-carrier-level Distributed Transmission for Shared Data Channel in E-UTRA Downlink," August 2006 (available at http://www.3gpp.org and incorporated herein by reference).

It should be noted that multiplexing of localized mode and distributed mode within a sub-frame is possible, where the amount of resources (RBs) allocated to localized mode and distributed mode may be fixed, semi-static (constant for tens/hundreds of sub-frames) or even dynamic (different from sub-frame to sub-frame).

In localized mode as well as in distributed mode in—a given sub-frame—one or multiple data blocks (which are, inter alia, referred to as transport-blocks) may be allocated separately to the same user (mobile station) on different resource blocks, which may or may not belong to the same service or Automatic Repeat reQuest (ARQ) process. Logically, this can be understood as allocating different users.

Link Adaptation

In mobile communication systems link adaptation is a typical measure to exploit the benefits resulting from dynamic resource allocation. One link adaptation technique is AMC (Adaptive Modulation and Coding). Here, the data-rate per data block or per scheduled user is adapted dynamically to the instantaneous channel quality of the respective allocated resource by dynamically changing the modulation and coding scheme (MCS) in response to the channel conditions. This may require a channel quality estimate at the transmitter for the link to the respective receiver. Typically hybrid ARQ (HARQ) techniques are employed in addition. In some configurations it may also make sense to use fast/slow power control.

L1/L2 Control Signaling

In order to inform the scheduled users about their resource allocation status, transport format and other user data related information (e.g., HARQ), Layer 1/Layer 2 (L1/L2) control signaling is transmitted on the downlink (e.g., together with the user data). Thereby, each user (or a group of users identified by a group ID) may be considered to be assigned a single L1/L2 control channel for providing L1/L2 control information to the respective user(s).

Generally, the information sent on the L1/L2 control signaling may be separated into the following two categories. Shared Control Information (SCI) carrying Cat. 1 information and Dedicated Control Information (DCI) carrying Cat. 2/3. The format of these types of control channel information has been, for example, specified for downlink user data transmissions in 3GPP TR 25.814:

TABLE 1

| | Field | | Size | Comment |
|---|---|---|---|---|
| Cat. 1 (Resource indication) | ID (UE or group specific) | | [8-9] | Indicates the UE (or group of UEs) for which the data transmission is intended |
| | Resource assignment | | FFS | Indicates which (virtual) resource units (and layers in case of multi-layer transmission) the UE(s) shall demodulate. |
| | Duration of assignment | | 2-3 | The duration for which the assignment is valid, could also be used to control the TTI or persistent scheduling. |
| Cat. 2 (transport format) | Multi-antenna related information | | FFS | Content depends on the MIMO/beamforming schemes selected. |
| | Modulation scheme | | 2 | QPSK, 16QAM, 64QAM. In case of multi-layer transmission, multiple instances may be required. |
| | Payload size | | 6 | Interpretation could depend on, e.g., modulation scheme and the number of assigned resource units (c.f. HSDPA). In case of multi-layer transmission, multiple instances may be required. |
| Cat. 3 (HARQ) | If asynchronous | Hybrid ARQ process number | 3 | Indicates the hybrid ARQ process the current transmission is addressing. |
| | | Redundancy version | 2 | To support incremental redundancy. |
| | | New data indicator | 1 | To handle soft buffer clearing. |
| | If synchronous hybrid ARQ is adopted | Retransmission sequence number | 2 | Used to derive redundancy version (to support incremental redundancy) and |

TABLE 1-continued

| Field | Size | Comment |
|---|---|---|
| | | 'new data indicator' (to handle soft buffer clearing). |

Similar, 3GPP TR 25.814 also suggests a L1/L2 control signaling format for uplink user data transmission:

TABLE 2

| Field | | Size | Comment |
|---|---|---|---|
| Resource assignment | ID (UE or group specific) | [8-9] | Indicates the UE (or group of UEs) for which the grant is intended. |
| | Resource assignment | FFS | Indicates which uplink resources, localized or distributed, the UE is allowed to use for uplink data transmission. |
| | Duration of assignment | 2-3 | The duration for which the assignment is valid. The use for other purposes, e.g., to control persistent scheduling, 'per process' operation, or TTI length, is FFS. |
| Transport Format (TF) | Transmission parameters | FFS | The uplink transmission parameters (modulation scheme, payload size, MIMO-related information, etc.) the UE shall use. If the UE is allowed to select (part of) the transport format, this field sets (determines) an upper limit of the transport format the UE may select. |

As can be recognized from Table 1 and Table 2 above, the number of control information bits is variable depending, for example, on the control channel information's relation to uplink or downlink user data transmissions.

Furthermore, some fields of the control channel information formats may also depend on the MIMO transmission mode of the data. For example, if data is transmitted in a special MIMO (Multiple Input Multiple Output) mode, the L1/L2 control information for this data may comprise multi-antenna related information, while this information may be omitted for data transmission without MIMO. But also for different MIMO schemes (such as Single User (SU) MIMO or Multi User (MU) MIMO) and configurations (e.g., rank, number of streams) the control channel information (prior to coding) may be different (also with respect to the number of bits).

For example, data on an allocated PRB might be transmitted to a UE using multiple codewords. In this case HARQ related information, payload size and/or modulation scheme might need to be signaled multiple times. Further, MIMO related information may include precoding related information, where the amount of required precoding information depends on the application of single user MIMO or multi user MIMO, on the rank and/or on the number of streams.

Similarly, the format (and size) of the L1/L2 control information may also depend on whether the control channel information relates to transmission of the data in a distributed or localized OFDM transmission.

In conventional systems (such as, for example, in UMTS High Speed Data Packet Access—HSDPA) the scheduling related control information are typically transmitted using a fixed modulation and coding scheme (MCS) level, which is known to all mobile stations within a radio cell.

Using a fixed modulation and coding scheme for L1/L2 control signaling would result in different amounts of resources that would have to be used for the L1/L2 control signaling on the physical channel resources which is however undesirable in view of UE complexity, scheduling flexibility, etc.

BRIEF SUMMARY

One solution to mitigate this problem may be to provide the mobile stations with a map indicating the downlink L1/L2 control channels resource utilization each sub-frame (for example, in form of so-called Cat. 0 control information). However, this approach may not be desirable, as it may require additional mobile station complexity, may lead to an additional delay in processing the control channel information in the mobile stations and would also require additional overhead due to sending the map indicating the downlink L1/L2-control channels resource utilization.

Another solution may be to only allow the allocation of predefined combination of mobile station (e.g., with predefined MIMO mode/configuration). However, this approach may imply an unacceptable restriction in scheduling functionality and a significant loss in system throughput.

An even further solution may be to send no map indicating the downlink L1/L2-control channels resource utilization each sub-frame (i.e., no Cat. 0 information) and to have no predefinition. This approach would thus require the mobile stations to blindly try to decode all possible combinations of modulation and coding schemes and mappings on resource elements to read the different control channels in a sub-frame. Accordingly, this approach would imply a significant and potentially undesirable increase in the mobile stations complexity.

A main object of the invention is to suggest another improved scheme for configuring control channels, in particular control channels related to the transmission of user data.

The main object is solved by the subject matter of the independent claims. Advantageous embodiments of the invention are subject matters of the dependent claims.

One main aspect of the invention is thus to align the size of the control channel information of different formats to an equal number of coded control channel information bits and/or modulation symbols for each control channel. The control channels may, for example, comprise scheduling related control information, such as, for example, L1/L2 control information. According to a further aspect of the invention, a more flexible solution is proposed that may allow for taking different geometries of mobile stations within a cell into account. Similar to the aspect above, the size of the control channel information is aligned by means of modulation and/or coding. However, in this exemplary aspect of the invention, the control channel information is aligned to one out of a set of numbers of coded control channel information bits and/or modulation symbols for each control channel.

A further aspect of the invention is to align the size of the control channel information of different formats to an equal number of coded control channel information bits and/or control channel elements for each control channel. Thereby, a control channel element (CCE) corresponds to a given number of modulation symbols or resource elements. Thus, the terms "given number of CCEs" and "given number of modulations symbols or resource elements" are essentially equivalent from a technical point of view, as a single CCE consists in turn of a given number of modulations symbols or resource elements.

Accordingly, if the application is mentioning the alignment of the size of the control channel information of different formats to an equal number of coded control channel information bits and/or modulation symbols for each control channel, this teaching equally applies to the alignment of the size of the control channel information of different formats to an equal number of control channel elements for each control channel.

One embodiment of the invention relates to a method that may be used for facilitating blind detection of plural control channels in a communication system on the receiver side. It is assumed that there are plural control channels provided and that the control channel information on the control channels have different formats, e.g., are structured differently and/or may also have different length. According to this embodiment, a transmitting entity of the communication system may apply to each control channel a modulation and coding scheme associated to the format of the control channel information of the control channel. Applying the modulation and coding scheme to the control channel causes a respective generation of an equal number of coded control channel information bits (e.g., output by a coder prior to modulation) and/or modulation symbols (e.g., output by a modulator) for each control channel.

Whether an equal number of coded control channel information bits and modulation symbols for each control channel is generated or whether an equal number of modulation symbols for each control channel is generated may, for example, depend on the processing of the control channel information and/or the configuration of the individual entities (such as coders, modulators, multiplexers, etc.)

In another embodiment of the invention, the different formats of the control channel information on the control channels have different numbers of control channel information bits. In the extreme case, the different control channels' formats all have a different number of control channel information bits.

In one embodiment, applying a modulation and coding scheme comprises coding the control channel information at the coding rate yielded by the modulation and coding scheme associated to the control channel's format and modulating the coded control channels according to the modulation scheme yielded by the modulation and coding scheme associated to a respective control channel's format. Further, the step of applying a modulation and coding scheme may comprise mapping the coded control channel information bits or the modulation symbols of the control channels to the downlink physical channel resource for transmission. In one example, the modulation symbols may be subjected to OFDM modulation and are subsequently mapped to the physical channel for transmission.

In one possible and exemplary realization of a modulation and coding schemes for use with the invention, the modulation and coding schemes associated to the control channels' formats all yield the same modulation scheme but different coding rates. In this exemplary realization, the coder may thus adapt the coding rate so that an equal number of coded control channel information bits and—due to the same modulation scheme in all modulation and coding schemes—also an equal number of modulation symbols for each control channel is generated by the modulator.

The control channel information may have different structures/formats. The control channel information format may, for example, depend on at least one of the following parameters:

the control channel's relation to a MIMO scheme or beamforming scheme utilized or to be utilized for the transmission of user data, the control channel's relation to uplink or downlink transmission of user data, the control channel's relation to a utilization of localized mode or distributed mode OFDM transmission for the transmission of user data.

Alternatively or in addition thereto, the control channel may carry paging related information or information related to a response to an uplink (random) access procedure.

In one exemplary embodiment, at least one receiver (of the control channels) is preconfigured with a specific MIMO scheme and the receiver may detect in a blind detection fashion whether localized mode or distributed mode OFDM transmission for the transmission of user data and whether the control channel relates to uplink or downlink user data transmission to select the correct modulation and coding scheme for demodulation and decoding of the control channel. Hence, in this embodiment, the detection of the transmission mode and the control channel information's relation to uplink or downlink, the receiver may determine the correct format of the control channel by means of blind detection and may decode the control channel information from the control channels (please note that not all control channels may need to be processed by the receiver—see below).

Alternatively, in another embodiment, at least one receiver is preconfigured for either localized mode or distributed mode transmission. In this case the receiver may use blind detection mechanisms to detect whether the control channel relates to uplink or downlink user data transmission and which MIMO scheme or beamforming scheme is used for the transmission of user data transmission to select the correct modulation and coding scheme for demodulation and decoding of the control channel.

In some embodiments of the invention, the control channels convey information related to the transmission of user data. For example, this information may be scheduling related control information, such as L1/L2 control information. Accordingly, the control channel may also be referred to as scheduling related control channels or L1/L2 control channels in this example.

In one further embodiment, a control channel conveys a resource indication of the user data, a transport format indication of the user data, and optionally information related to a retransmission protocol used for transmitting the user data. Alternatively or in addition, a control channel may also convey a resource assignment for the user data and uplink transmission parameters for the user data, and optionally information related to a retransmission protocol used for transmitting the user data.

According to another embodiment, the control channels may convey control channel information related to downlink transmission only, control channel information related to uplink transmission only or control channel information related to downlink and uplink transmission.

The control channel information of a control channel may convey different types of information. For example, in case the control channels convey L1/L2 control information such as Cat. 1, Cat. 2 and optionally Cat. 3 information, the different information conveyed by a control channel may be jointly encoded.

In a further embodiment, the transmitting entity may further transmit the control channels on a downlink physical channel resource. As indicated above, a receiving entity may perform a blind detection of at least a subset of the physical resources on which the control channels are mapped (e.g., on those physical resources on which a subset of certain control channel information formats is conveyed). Thereby, the receiving entity's knowledge on the modulation and coding schemes associated to the different formats of the control channel information on the control channels is used to limit the number of trials in the blind detection.

Further, according to one exemplary embodiment, the number of control channel information bits (or a control channel information format) of a control channel may be associated to one modulation and coding scheme according to a pre-configuration or according to a configuration message.

In an exemplary variation of this embodiment, the pre-configuration is achieved by transmitting a higher layer message on the data channel to one or more receiving entities on a dedicated or shared channel. This message may instruct a respective receiving entity to perform a blind detection on only a subset of the physical resources on which the control channels are mapped and/or a subset of control channel information formats.

In an alternative variation of the embodiment, the configuration message may, for example, be a broadcast message sent on the broadcast channel to instruct one or more receiving entities to perform a blind detection on only a subset of the physical resources on which the control channels are mapped and/or a subset of control channel information formats.

For example, the configuration message may be sent as a separate piece of control information on a separate control channel. In one exemplary implementation, the configuration message and the control channels are transmitted every sub-frame or slot.

In another embodiment of the invention, one or more receiving entities may be instructed to perform a blind detection on only a subset of the physical resources on which the control channels are mapped and/or control channel information formats by means of pre-configuration and/or a configuration message.

Further, in another embodiment, a receiving entity may be configured to blindly detect only a subset of the physical resources on which the control channels are mapped and/or a subset of the control channel information formats.

As indicated above, another aspect of the invention is to suggest a more flexible configuration of control channels without thereby, for example, unduly increasing the required mobile station complexity, reducing scheduling flexibility, or the like. Accordingly, in another embodiment, each of the control channels' formats is associated to a number of N modulation and coding schemes, where N>1. In this embodiment, all modulation and coding schemes, when applied to the control channels of the associated formats, may respectively generate a given number out of N different numbers of coded control channel information bits and/or modulation symbols. In one exemplary embodiment, the output sizes are integer multiples of the smallest output size in order to simplify multiplexing of the control channels.

Accordingly, when applying a modulation and coding scheme to the control channels, one out of the N modulation and coding schemes associated to a format of a control channel may be selected. This selection may, for example, be based on the geometry of the receiver in the radio cell or other parameters such as received signal strength, fading or frequency selectivity of the channel, the receiver type or the available transmit power. The selected modulation and coding scheme may be applied to the control channel information of the control channel.

Another embodiment of the invention considers the mapping of the control channels to different aggregation sizes—that is, to different numbers of modulation symbols or control channel elements. The control channel information bits of a respective control channel format are mapped to at least one out of a set of aggregation sizes, wherein each of the aggregation sizes is given by a number of modulation symbols or control channel elements.

Accordingly, further restrictions may be considered in this mapping. For example, the control channel information bits of a respective control channel format may be mapped only to those aggregation sizes that yield a code rate for the control channel information bits achieving a given reliability criterion, such as a desired maximum block error rate. In addition or as another example, the control channel information bits of a respective control channel format may also be mapped only to those aggregation sizes that yield a code rate for the control channel information bits above a minimum code rate or below a maximum code rate. In another example, the aggregation sizes are mutually distinct.

A further exemplary embodiment considers the systems where different bandwidths may be used for transmission. In these systems, it may be advantageous, if the control channel information bits of at least one control channel format are always mapped to the same aggregation size or aggregation sizes, irrespective of the system bandwidth.

In a further embodiment of the invention, a subset of the control channels for conveying control information related to uplink user data transmission and a subset of the control channels for conveying control information related to downlink user data transmission may be configured. This may have the advantage that, for example, receiving entities that only listen to downlink services may only need to process those control channels that relate to user data transmissions on the downlink. Similarly, according to another embodiment, a subset of the control channels for conveying control information for user data transmission with MIMO or in a specific MIMO mode may be configured.

In another embodiment of the invention, the control channel information of a control channel comprises a format identifier, which may yield the control channel information format of the respective control channel.

In an alternative embodiment, the control channel information of a control channel comprises a format identifier, which may yield the control channel information format of the respective control channel, if for a given control channel information bits size multiple formats exist.

Further, it may be advantageous, if a higher level modulation and coding scheme (or higher code rate only) is used for control channels conveying control channel information comprising MIMO information than for control channels conveying control channel information comprising no MIMO control information.

Further, it may be advantageous, if a higher level modulation and coding scheme (or higher code rate only) is used for control channels conveying control channel information comprising more MIMO information than for control channels conveying control channel information comprising less MIMO control information.

Another embodiment of the invention is related to a base station for configuring plural control channels in a mobile communication system. The base station may comprise a transmitting entity for applying to each control channel a modulation and coding scheme associated to the format of the control channel information of the control channel, thereby respectively generating an equal number of coded control channel information bits and/or modulation symbols for each control channel.

In some embodiments of the invention, the base station further comprises a coder for coding the control information at the coding rate yielded by the modulation and coding scheme associated to the control channel's format, a modulator for modulating the coded control channels according to the modulation scheme yielded by the modulation and coding scheme associated to a respective control channel's format and a mapping unit for mapping the coded control channel information bits or the modulation symbols of the control channels to the downlink physical channel resource for transmission.

In a variation of the embodiment, the base station also includes a multiplexer for multiplexing the coded control channel information bits of different control channels prior to their modulation by the modulator. Alternatively, the multiplexer could multiplex control channel information bits of different control channels prior to their coding by the coder.

A further embodiment is related to a base station that is adapted to perform or to participate in the steps of the method for facilitating the blind detection of control channels according to one of the different embodiments and variations thereof described herein.

Another embodiment relates to a mobile station for use in a mobile communication system. The mobile station may, for example, comprise a receiver for receiving at least a subset of a plurality of control channels from a downlink physical channel resource, wherein the control channels have different formats. A modulation and coding scheme associated to the format of a respective control channel has been applied to the respective control channel by a transmitting entity. Moreover the mobile station may include a processing unit for performing a blind detection of the subset of control channels to reconstruct the control channel information of a respective received control channel, wherein the modulation and coding schemes associated to the different formats of the control channel information on the control channels are used to limit the number of trials in the blind detection.

In a further embodiment, the mobile station utilizes the following means of the mobile station to perform the blind detection. A demultiplexing unit (demultiplexer) may be used for demultiplexing the received signal of the respective received control channels to modulation symbols. Further, the mobile station may comprise a demodulator for demodulating the modulation symbols to soft decision values and constructing a codeword consisting of a given number of coded control channel information bits, and a decoder for decoding the coded control channel information bits (also referred to as a codeword) to obtain the control channel information bits. Thereby, at least one of the demultiplexing unit, the demodulator and the decoder uses the mobile station's knowledge on the modulation and coding schemes associated to the different formats of the control channel information on the control channels is used to limit the number of trials in the blind detection.

The mobile station according to another exemplary embodiment of the invention is adapted to perform or to participate in the steps of the method for facilitating blind detection of control channel according to one of the various embodiments and variations thereof described herein.

Another embodiment of the invention relates to a mobile communication system for transmitting plural control channels having different formats. This system may comprise a transmitting entity (e.g., a base station as described herein) for applying to each control channel a modulation and coding scheme associated to the format of the control channel information of the control channel, thereby respectively generating an equal number of coded control channel information bits and/or modulation symbols for each control channel and at least one receiving entity (e.g., a mobile station as described herein) to receive at least a subset of the control channels.

BRIEF DESCRIPTION OF THE SEVERAL VIEWS OF THE DRAWINGS

In the following the invention is described in more detail in reference to the attached figures and drawings. Similar or corresponding details in the figures are marked with the same reference numerals.

FIG. 5 shows an illustrative example of a control channel configuration using a single modulation and coding scheme for all control channels in a resource grid as shown in FIG. 4, FIGS. 6 and 7 show illustrative examples of control channel configurations in a resource grid as shown in FIG. 4 according to different exemplary embodiments of the invention.

DETAILED DESCRIPTION

The following paragraphs will describe various embodiments of the invention. For exemplary purposes only, most of the embodiments are outlined in relation to an (evolved) UMTS communication system according to the SAE/LTE discussed in the Technical Background section above. It should be noted that the invention may be advantageously used, for example, in connection with a mobile communication system such as the SAE/LTE communication system previously described, but the invention is not limited to its use in this particular exemplary communication network.

Figure 4:
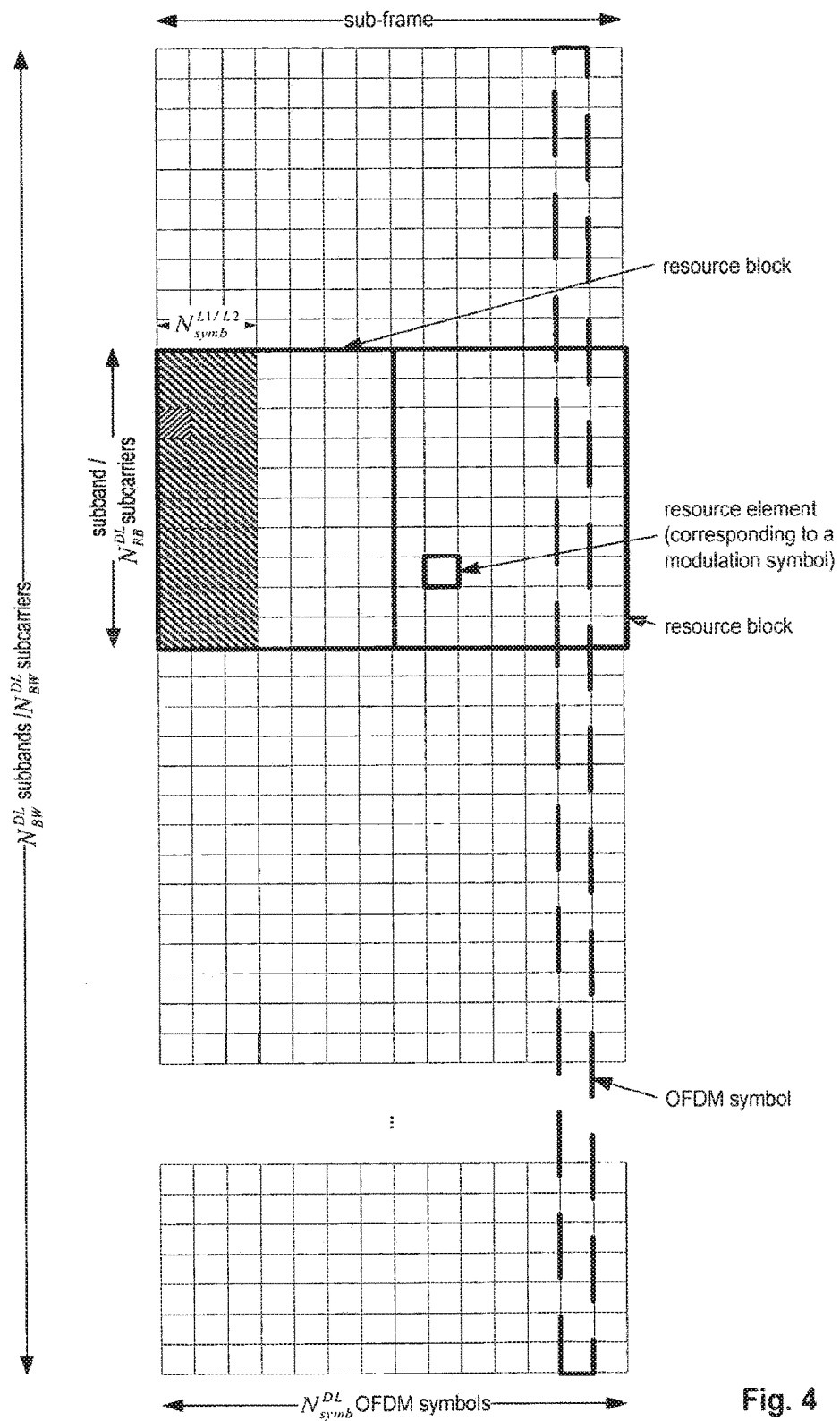
FIG. 4 shows an exemplary resource grid of a sub-frame of an OFDM channel according to an embodiment of the invention.

The following description will be mainly based on a downlink channel structure as explained in the Technical Background section. Further, to the explanations in the technical background section, it may be assumed for exemplary purposes that two (or more) slots form a sub-frame, while a given number of sub-frames in turn form a frame on the channel. FIG. 4 shows an exemplary resource grid of a sub-frame of an OFDM channel according to an embodiment of the invention and is used to illustrate the sub-frame structure assumed for exemplary purposes in most of the embodiments described herein. As can be recognized from FIG. 4, two slots are supposed to form a sub-frame in the time domain. Hence, a sub-frame on an OFDM downlink channel may be assumed to consist of two resource blocks in a time domain; each resource block being formed by a given number of $N_{RB}^{DL}$ subcarriers or a subband in the frequency domain and a given number $N_{symb}^{DL}$ of OFDM symbols in the time domain. Moreover, a given number of OFDM symbols or resource elements/modulation symbols on a sub-frame may be reserved for control signaling (e.g., scheduling related control signaling for user data in the user data section of the sub-frame). In the embodiment shown in FIG. 4 it is assumed for exemplary purposes that the control channels are provided in the first three OFDM symbols of the sub-frame (i.e., in this example the three first OFDM symbols of the first slot of the sub-frame). However, it should be noted that also other mappings of the control signals to the physical resources in a sub-frame may be used.

As has been outlined in the Technical Background section, using a fixed modulation and coding scheme for the L1/L2 control channels may be disadvantageous, as the control channel information would be mapped to different numbers of modulation symbols and thus utilize different numbers of physical radio resources for transmission depending on the control channel information size. This scenario is exemplarily depicted in FIG. 5 (please note that the different patterns of the resource elements in the control channel related OFDM symbols is intended to illustrate the control channels for different users). In FIG. 5 it is assumed for exemplary purposes that the first three OFDM symbols of the resource block are reserved for the control channels of the users. Hence, depending on the size of the respective control channel information format, the number of physical resources (modulation symbols) for the respective control channels is variable. This has the disadvantage that for blind detection for receiving the control channels on the mobile station's side, a high complexity receiver in the mobile stations may be required. This is caused by the fact that the possible locations of the control channels to be decoded depend on the control channel formats. Therefore, in a given sub-frame, a receiver would need to blindly decode all possible combinations and locations of the control channel formats.

One main aspect of the invention is to align the size of the control channel information of different formats to an equal number of coded control channel information bits, modulation symbols and/or Control Channel Elements (CCE) for each control channel (a CCE corresponds to a given number of modulation symbols which may alternatively referred to as resource elements). Thereby, the number of blind detection tries of the control channels may be reduced as the location of the control channels on the physical resources may be known by the mobile stations (or there is at least a limited number of possible locations).

The alignment of the control channel information according to different formats may, for example, be achieved by using different modulation and coding schemes for the different control channels depending on the format of the control channel information on a respective channel. If, for example, the modulation scheme for all control channels is the same, this may mean that the coding rate of a coder may be configured so as to output the same number of coded control channel information bits for each control channel, so that the control channel information of each control channel would also be mapped to an equal number of modulation symbols. If the modulation scheme is variable for the control channels, the coding rate and modulation scheme may be chosen for a respective format of the control channel information, such that the control channel information of all control channels gets mapped to the same number of modulation symbols or CCEs.

FIG. 6 shows an example of one possible control channel configuration in a resource grid as shown in FIG. 4 according to an exemplary embodiment of the invention. As in FIG. 5, the different patterns of the resource elements in the control channel related OFDM symbols illustrates the control channels of different users. In contrast to FIG. 5, the use of different modulation and coding schemes for the control channels of the different users according to the format of the control channel information on the respective channels allows alignment of the physical resource utilization of the different control channels, i.e., all control channels are mapped to a single number of resource elements/modulation symbols (6 resource elements/modulation symbols/CCEs in the example of FIG. 6).

This may facilitate blind detection of the control channels on the receiver side, as the relative position of the channels in a frame is known at the receivers so that—at maximum— the number of available modulation and coding schemes for the different control channel information formats has to be tested to find the matching modulation and coding scheme and to decode the respective control channel. As will be explained further below, the number of tries in blind detection may be further reduced, e.g., by further (pre)configuration of the receivers. With an implementation according to this aspect of the invention, flexibility in the use of different modulation and coding schemes for control signaling may be possible, while at the same time the number of tries in blind detection of the control channels may be limited to a number equal to or smaller than the number of different control channel information formats. This is in contrast to the potentially much higher number of tries when needing to blindly detect the location of the control channels on the physical resources.

According to a further aspect of the invention, a more flexible solution is proposed that may allow for taking different geometries of mobile stations within a cell into account. Apparently, the coding rate for the control channel depends on the number of control channel information bits to a given number of modulation symbols/resource elements and the utilized modulation scheme. Accordingly, the coding rate increases as the number of control channel information bits increase, if the modulation scheme and the number of modulation symbols/resource elements are unchanged. This in turn may yield coding rates for some control channels that are not feasible in terms of their performance, e.g., for transmitting the control channel with a given block error rate (BLER) to mobile stations located at the cell edge experiencing high interference and/or low received signal strength (low geometry mobile stations).

Similar to the aspect above, the size of the control channel information is aligned by means of modulation and/or coding. However, in this exemplary aspect of the invention, the control channel information is aligned to one out of a set of numbers of coded control channel information bits, modulation symbols and/or CCEs for each control channel. In some exemplary embodiments, the output sizes are integer multiples of the smallest output size which may, for example, allow simplifying multiplexing of the control channels.

Hence, for example, again considering the case of having a fixed modulation scheme for all control channels, the coder may output either a number of $N_1$ or $N_2$ coded control channel information bits for all formats of control channel information conveyed by the control channels, which in turn will be modulated to $M_1$ or $M_2$ modulation symbols. Alternatively, if the modulation scheme is also variable, the coder could choose a coding rate so that N coded channel information bits are output to the modulator for each control channel, while the modulator may use different modulation schemes (e.g., depending on the mobile stations geometries) so as to modulate the N coded channel information bits to $M_1$ or $M_2$ modulation symbols. Hence, in one exemplary embodiment of the invention, the different numbers of the coded bits, modulation symbols and/or CCEs of a control channel information format are multiples of the smallest of the coded control channel information, modulation symbols and/or CCEs (e.g., $M_2 = n \times M_1$, with n being a positive integer number), which may be advantageous as it allows for a simplification of the multiplexing of the control channels.

Optionally, there may be additional restrictions to be considered in this aspect of the invention. E.g., the output sizes $M_1$ or $M_2$ of the modulation symbols (also referred to as aggregation sizes herein) may be required to correspond to $2^n$ times the smallest output size (where n is an integer number, e.g., $n \in \{1,2,4\}$ or $n \in \{1,2,3\}$). The size of a CCE may be defined such that the smallest output size of a control channel is identical to a single CCE, which would correspond to n=0 in the example above.

FIG. 7 shows an example of one possible control channel configuration in a resource grid as shown in FIG. 4 according to an exemplary embodiment of the invention and is used to illustrate this further aspect of the invention. As in FIG. 5 and FIG. 6, the different patterns of the resource elements in the control channel related OFDM symbols illustrate the control channels of different users. Instead of mapping the control channel information of the different formats to a single number of coded control channel information and/or modulation symbols as in FIG. 6, there may be at least two different numbers of coded control channel information and/or modulation symbols defined. Accordingly, each control channel information format may be associated to a modulation and coding scheme that maps the control channel information of a format to either the first or the second number of coded control channel information, modulation symbols and/or CCEs. Alternatively or in addition, at least some of the formats may be associated to two modulation and coding schemes so as to map the control channel information of a format to either the first or the second number of coded control channel information and/or modulation symbols. In FIG. 7 it may be assumed for exemplary purposes that the control channel information is either mapped to three resource elements/modulation symbols or six resource elements/modulation symbols depending on various reasons. Those reasons might be the geometries, the received signal strength, the frequency and/or time selectivity of the channel of a mobile station (UE) to which the control information is dedicated.

Similarly to the embodiments of the invention discussed with respect to FIG. 6, this configuration of the control channels may still allow for a simple blind detection at the receivers. Though the complexity is slightly increased due to having different numbers of coded control channel information and/or modulation symbols to which the control channel information may be mapped, still the number of tries is comparably low in comparison to testing all possible locations of the control channels on the physical resources if using a single known modulation and coding scheme for all control channels, since the number of different control channel information formats is expected to be larger than the number of defined control channel sizes (in modulation symbols).

It should be noted that the control channel locations in FIGS. 5, 6 and 7 show a logical representation of the control channel to modulation symbol, resource element or CCE mapping in order to visualize the sizes. The actual mapping of a given control channel may be distributed in time and/or frequency domain, e.g., on modulation symbol, resource element or CCE level.

The number of coded control channel information bits, modulation symbols and/or the CCEs to which a respective control channel carrying control information of a certain format is mapped by means of modulation and coding may, for example, depend on one or more different parameters.

Figure 17:
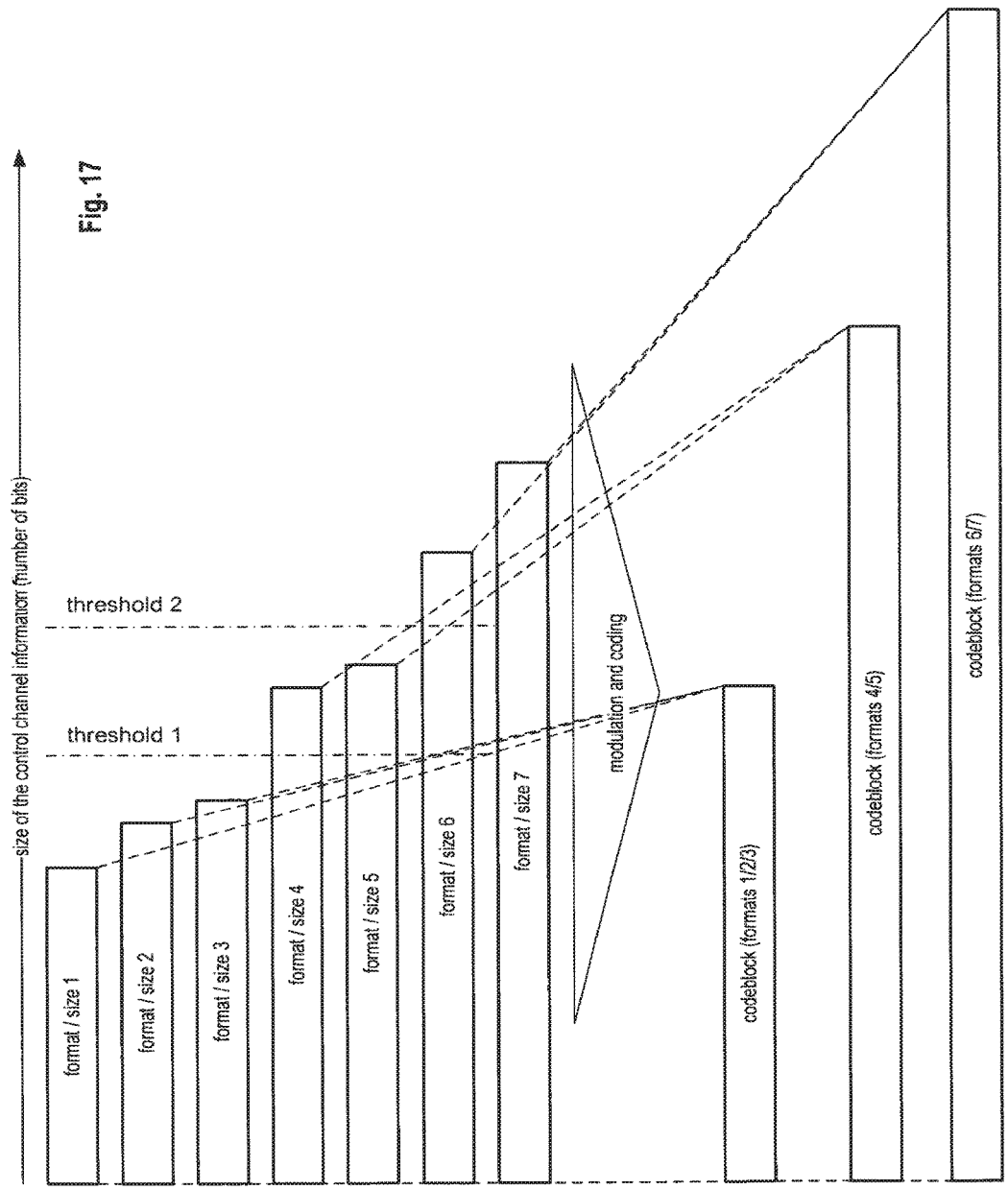
FIG. 17 illustrates another exemplary embodiment of the invention where control channel information formats are mapped to different numbers of coded control channel information and/or modulation symbols depending on the format size.

For example, formats having a size of more than a certain threshold number of control information bits may be mapped to a higher number of coded control channel information, modulation symbols and/or CCEs than formats having a size of less or equal to the threshold number of control information bits. This may be advantageous in cases the size of the control information formats vary significantly, as it may allow for ensuring certain reliability in the control signaling and/or maintaining an acceptable level of spectral efficiency. An exemplary embodiment is illustrated in FIG. 17.

Figure 18:
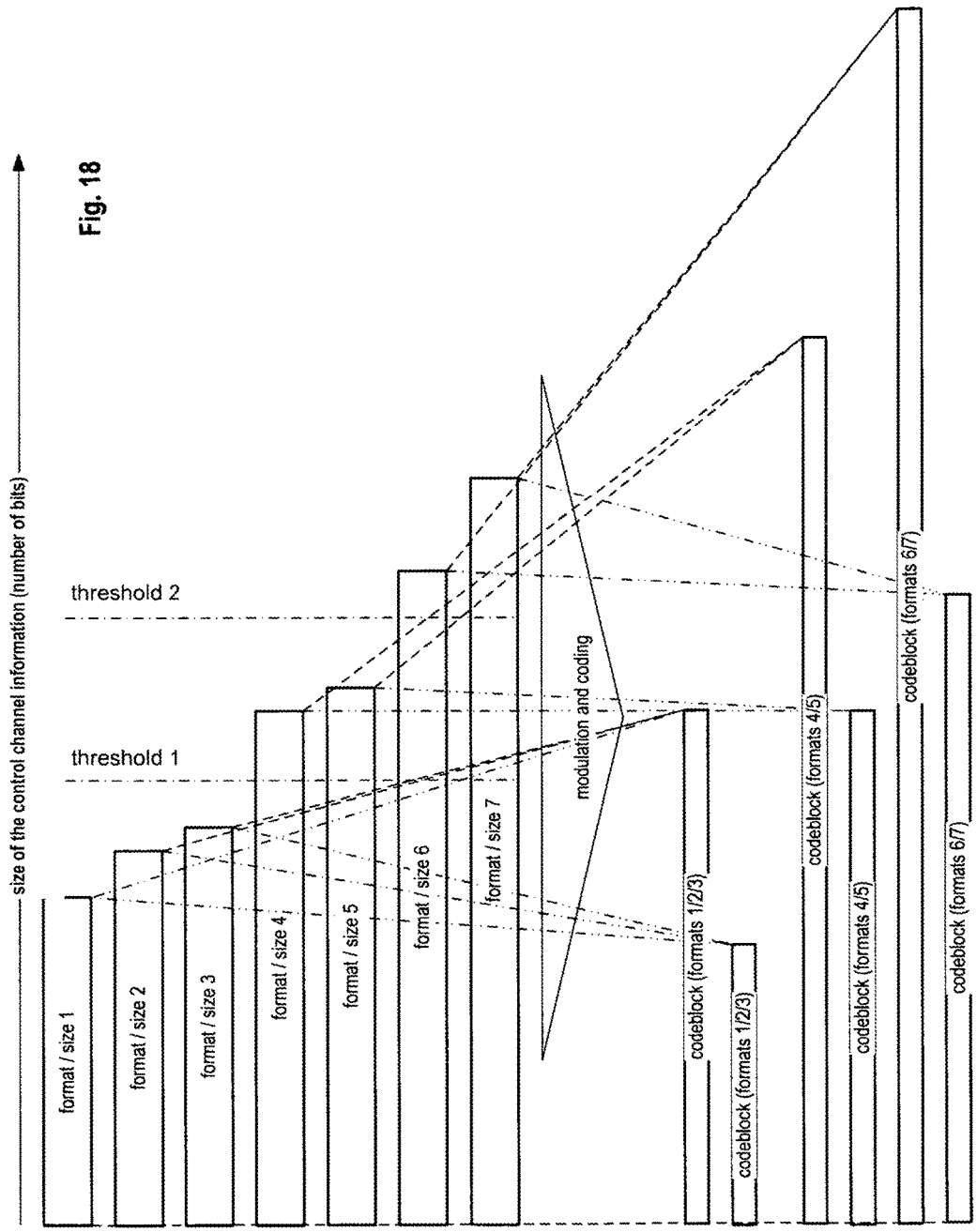
FIG. 18 illustrates another exemplary embodiment of the invention where control channel information formats are mapped to different numbers of coded control channel information and/or modulation symbols depending on the format size and optionally another parameter, such as, e.g., the channel quality.

In addition or alternatively, another criterion for deciding on which of the available numbers of coded control channel information, modulation symbols and/or CCEs the control channel information of a control channel (i.e., user or group of users respectively) is to be mapped may also depend on the geometries of the user(s). For example, in case the channel quality of a user (e.g., measured in terms of Signal-to-Noise Ratio (SNR), Signal-to-Interference Ratio (SIR), Signal to Interference-plus-Noise Ratio (SINR), etc.) is low (e.g., below a threshold) and the size of the control channel format for that user being large in comparison to the other formats, a modulation and coding scheme with high spectral efficiency is likely to be associated to the control channel information format so as to map the control channel to a given number of coded control channel information and/or modulation symbols. However, in view of the user's geometry in the cell, this modulation and coding scheme may not allow to provide the desired bit-error-rate for the control channel information. This alternative or additional criterion and the resulting mapping of the control channel information of the different formats to different codeblock sizes is exemplarily illustrated in FIG. 18.

The two tables (Tables 3 and 4) below give examples for different control channel information sizes and the resulting code rates, assuming for exemplary purposes that the control channels are transmitted with QPSK modulation. In the examples, it is further assumed for exemplary purposes that the coded control channel sizes (aggregation sizes) given in modulation symbols (resource elements (REs)) or CCEs are 8, 4 or 2 times the smallest size (rightmost column, 1 CCE). Table 3 assumes that a CCE consists of 36 REs, i.e., the smallest coded control channel sizes (CCE aggregation size) is 36 REs or 1 CCE. In Table 4 it is assumes that a CCE consists of 24 REs, i.e., the smallest coded control channel sizes (CCE aggregation size) is 24 REs or 1 CCE.

It should be noted that a given control channel information size may represent different control channel formats, e.g., control channel information of Size 1 may, for example, correspond to a non-MIMO downlink allocation, and an uplink non-MIMO or uplink multi-user MIMO allocation and control channel information of Size 4 may correspond to an downlink single-user MIMO allocation with 1 codeword and to a downlink multi-user MIMO allocation. The code rate may be calculated by:

$$\text{coding rate} = \frac{\text{control channel information bits}}{\text{coded control channel bits}} = \frac{\text{control channel information bits}}{\text{number of } REs \cdot \text{bits per } RE}$$

I.e., for example, the coding rate for control channel information (CCI) format Size 2 using 4 CCEs (according to Table 3, i.e., 36 REs per CCE and QPSK modulation) is calculated as follows:

$$\text{coding rate (Size 2, 4 } CCEs) = \frac{38}{144 \ REs \cdot 2^{bits}/RE} = 0.13$$

In both tables below, it is assumed for exemplary purposes that QPSK code rates smaller than, e.g., 0.10 are not required, since a code rate of 0.10 is, e.g., sufficient to reach cell edge UEs. Similarly, code rates larger than, e.g., 0.80 are not required since, e.g., the decoding performance (achievable BLER) is not reasonable due to a decoding error floor). Hence, the hatched cells in the tables indicate that the control channel information size is not mapped onto the respective coded control channel size.

TABLE 3

|  |  | CCE Aggregation Sizes | | | |
|---|---|---|---|---|---|
|  |  | 8 CCE (288 REs) | 4 CCE (144 REs) | 2 CCE (72 REs) | 1 CCE (36 REs) |
| Control Channel information sizes | Size 1 [35 bit] | 0.06 | 0.12 | 0.24 | 0.49 |
|  | Size 2 [38 bit] | 0.07 | 0.13 | 0.26 | 0.53 |
|  | Size 3 [42 bit] | 0.07 | 0.15 | 0.29 | 0.58 |
|  | Size 4 [49 bit] | 0.08 | 0.17 | 0.34 | 0.68 |
|  | Size 5 [58 bit] | 0.10 | 0.20 | 0.40 | 0.81 |
|  | Size 6 [67 bit] | 0.11 | 0.23 | 0.47 | 0.93 |

TABLE 4

|  |  | CCE Aggregation Sizes | | | |
|---|---|---|---|---|---|
| Code Rate | | 8 CCE (192 REs) | 4 CCE (96 REs) | 2 CCE (48 REs) | 1 CCE (24 REs) |
| Control Channel information sizes | Size 1 [35 bit] | 0.09 | 0.18 | 0.36 | 0.73 |
| | Size 2 [38 bit] | 0.10 | 0.20 | 0.40 | 0.79 |
| | Size 3 [42 bit] | 0.11 | 0.22 | 0.44 | 0.88 |
| | Size 4 [49 bit] | 0.13 | 0.26 | 0.51 | 1.02 |
| | Size 5 [58 bit] | 0.15 | 0.30 | 0.60 | 1.20 |
| | Size 6 [67 bit] | 0.17 | 0.35 | 0.70 | 1.40 |

Similar to Tables 3 and 4 above, also Table 5 below assumes for exemplary purposes a QPSK modulation of the control channel information CCI. In contrast to Tables 3 and 4 above, Table 5 exemplifies a situation where different control channel formats (see column "Format") are used and some of the available formats carry the same number of control channel information bits, i.e., have the same control channel information size. Similar to the example with respect to Tables 3 and 4 above, it may be assumed that coding rates below or above a given threshold are not used. Furthermore, as can, for example, be seen in the rows (Size 2, Format 3), (Size 4, Format 6) or (Size 4, Format 7) the mapping to certain CCE aggregation sizes may be inhibited. For example, such restriction of the mapping to only a subset of the available CCE aggregation sizes may be feasible, if for example, only specific coding rates for transmitting the control channel information of the given format are needed to ensure the desired reliability of the transmission, e.g., due to having to meet a given BLER for cell edge UEs (limitation on lower code rates) or to avoid a decoding error floor (limitation on higher code rates). Considering the combination (Size 5, Format 8), the control data on the control channel may, for example, need a high protection level, so that only coding rate 0.15 is used, i.e., the CCI of the control channel format is always mapped to 8 CCEs.

The limitation of the allowed CCE aggregation sizes for given formats may further help to reduce the number of blind detections required by a UE. E.g., if a UE needs to decode format 7 (and not formats 5 and 6), it has to perform blind decodings only on 2 CCE aggregation sizes (4, 2 CCEs) instead on all CCE aggregation sizes. If an UE needs to decode formats 6 and 7 (and not format 5), it still needs to perform blind decodings on 4 and 2 CCEs. If a UE needs to decode formats 5, 6 and 7, it would require blind decodings of 8, 4 and 2 CCEs.

As will be discussed below in further detail, the control channel information of the respective control channel format formats may optionally include an identifier to allow the receiving entity distinguishing the different formats.

In one exemplary embodiment, the different control channel formats are defined as in 3GPP Tdoc. R1-074906, "PDCCH payload formats, sizes and CCE aggregation," 3GPP TSG-RAN WG1 Meeting #51, November 2007 (available at http://www.3gpp.org and incorporated herein by reference):

Format 1: Uplink assignment (UL)

Format 2: Downlink non-MIMO assignment (compact DL assignment) (DL-C)

Format 3: Single-user MIMO downlink assignment (1 codeword) (DL-SU1)

Format 4: Single-user MIMO downlink assignment (2 codewords) (DL-SU2)

Format 5: Multi-user-user MIMO downlink assignment (DL-MU)

Format 6: Beamformed or open loop transmit diversity downlink assignment (DL-BF/OLT)

In this exemplary embodiment, the following mechanisms may be applied:

The MIMO formats (Formats 3, 4 and 5) may preferably be applied to mobile stations (UEs) in high geometry (close to the cell center/experiencing only little interference), which means that those formats should be preferably transmitted with higher code rates, i.e., transmission with low code rates is not required The non-MIMO format and the UL format (Formats 1 and 2) may be applied to all UEs in the system, e.g., needed for cell-edge coverage and needed for cell-center UEs

TABLE 5

|  |  |  | CCE Aggregation Sizes | | | |
|---|---|---|---|---|---|---|
| Code Rate | | Format | 8 CCE (192 REs) | 4 CCE (96 REs) | 2 CCE (48 REs) | 1 CCE (24 REs) |
| Control Channel information sizes | Size 1 [35 bit] | Format 1 | 0.06 | 0.12 | 0.24 | 0.49 |
| | Size 2 [38 bit] | Format 2 | 0.10 | 0.20 | 0.40 | 0.79 |
| | | Format 3 | 0.10 | 0.20 | 0.40 | 0.79 |
| | Size 3 [42 bit] | Format 4 | 0.11 | 0.22 | 0.44 | 0.88 |
| | Size 4 [49 bit] | Format 5 | 0.13 | 0.26 | 0.51 | 1.02 |
| | | Format 6 | 0.13 | 0.26 | 0.51 | 1.02 |
| | | Format 7 | 0.13 | 0.26 | 0.51 | 1.02 |
| | Size 5 [58 bit] | Format 8 | 0.15 | 0.30 | 0.60 | 1.20 |
| | | Format 9 | 0.15 | 0.30 | 0.60 | 1.20 |
| | | Format 10 | 0.15 | 0.30 | 0.60 | 1.20 |
| | Size 6 [67 bit] | Format 11 | 0.17 | 0.35 | 0.70 | 1.40 | without MIMO transmission, i.e., these formats may be transmitted with a wide range of code rates.

Format 6 may not or may rarely be needed for cell-center UEs and may, hence, be transmitted preferably with low code rates.

Depending on the control channel information size of the respective format this will result in different CCE aggregation sizes. An example of the mapping of the respective control channel information sizes and formats is shown in Table 6 below (even though the Format SU2 should be transmitted mapped onto high code rates, there may be limitation in maximum reasonable code rate—as mentioned earlier—due to error floor issues):

TABLE 6

| Code Rate | | Format | CCE Aggregation Sizes | | | |
|---|---|---|---|---|---|---|
| | | | 8 CCE (288 REs) | 4 CCE (144 REs) | 2 CCE (72 REs) | 1 CCE (36 REs) |
| Control Channel information sizes | ... | ... | ... | ... | ... | ... |
| | Size 2 [38 bit] | UL | 0.07 | 0.13 | 0.26 | 0.53 |
| | | DL-C | 0.07 | 0.13 | 0.26 | 0.53 |
| | Size 3 [43 bit] | DL-BF/OLT | 0.07 | 0.15 | 0.29 | 0.58 |
| | Size 4 [49 bit] | DL-SU1 | 0.08 | 0.17 | 0.34 | 0.68 |
| | | DL-MU | 0.08 | 0.17 | 0.34 | 0.68 |
| | Size 5 [58 bit] | DL-SU2 | 0.10 | 0.20 | 0.40 | 0.81 |

When dealing with different control channel formats having the same control channel information size, it may be thus advantageous to allow for two or more different numbers of coded control channel information and/or modulation symbols (CCEs) for a respective control channel information format associated to modulation and coding schemes of different spectral efficiency so that also the geometry of the user may be taken into account.

The selection of the number of coded control channel information and/or modulation symbols to which the control channel information of a format is to be mapped may, for example, be additionally or alternatively based on other parameters such as received signal strength of the control channels, fading or frequency selectivity of the downlink channel, the available transmit power or simply the receiver type.

Generally, it should be noted that the control channels may, for example, comprise scheduling related control information, i.e., the control channel may also be referred to as scheduling related control channels. In some exemplary embodiments of the invention the control channels are L1/L2 control channels for providing the users (mobile stations) with L1/L2 control information related to uplink and/or downlink data transmissions on a shared channel. In some exemplary embodiments, each control channel comprises the L1/L2 control channel information related to uplink and/or downlink data transmission on a shared channel to/from a single user/mobile station. Alternatively or in addition thereto, a control channel may optionally also carry paging related information or information related to a response to an uplink (random) access procedure.

Figure 8:
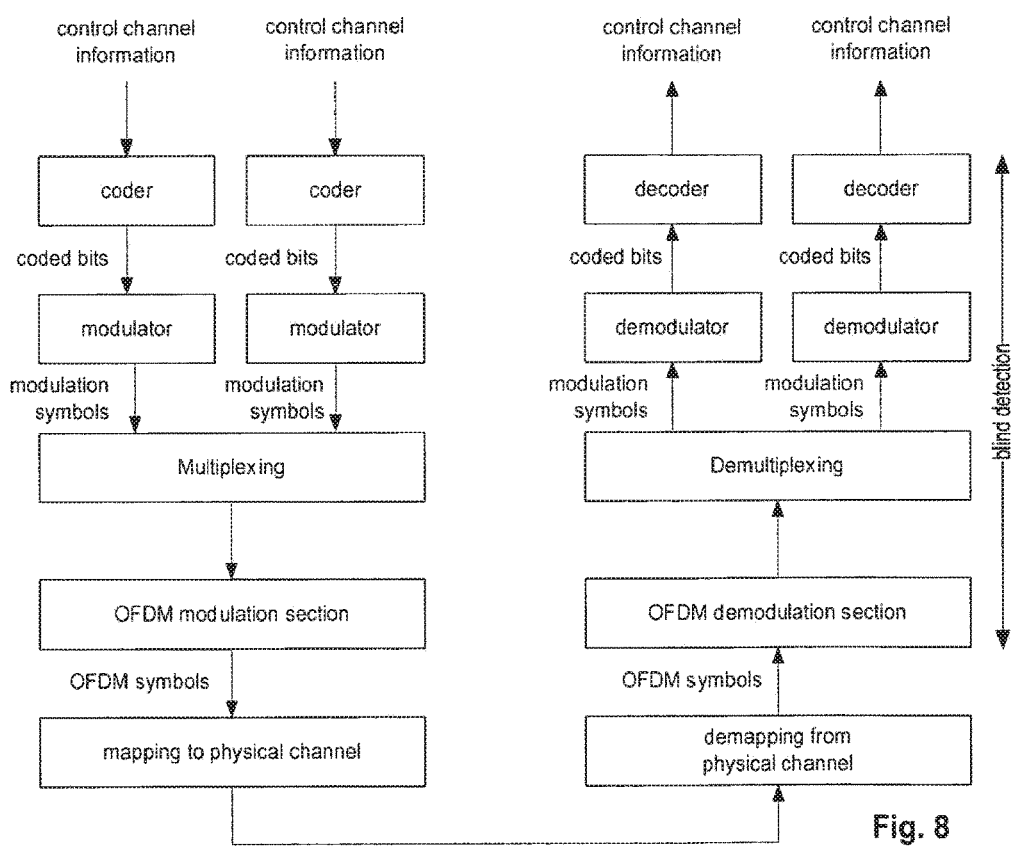
FIGS. 8 and 9 show two exemplary structures of the processing of control channel information of plural control channels on the Physical Layer according to different embodiments of the invention.

FIG. 8 shows an exemplary structure of the processing of control channel information of plural control channels on the physical layer according to an embodiment of the invention. For illustrative purposes only, the processing of two control channels is shown (of course, in real-life systems there may be typically more than two control channels provided in a subframe). Further, not shown in FIG. 8, there may be a rate matching unit between the coding section and the modulator for adapting the coding rate of the coding section to a desired coding rate (e.g., by puncturing or repetition).

Figure 14:
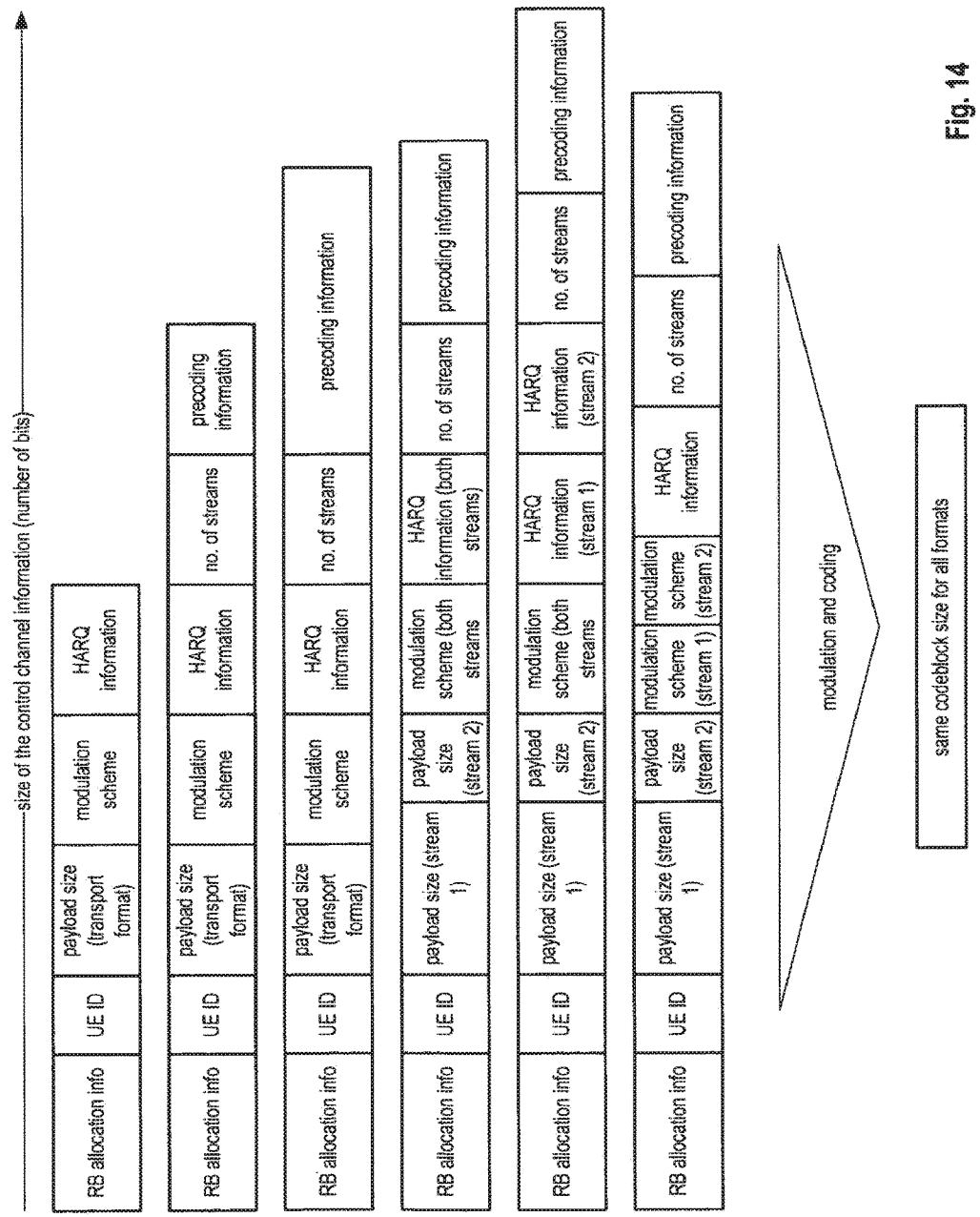
FIG. 14 shows several different formats of control channel information and their mapping to a single codeblock size by means of modulation and coding according to an exemplary embodiment of the invention.
Figure 15:
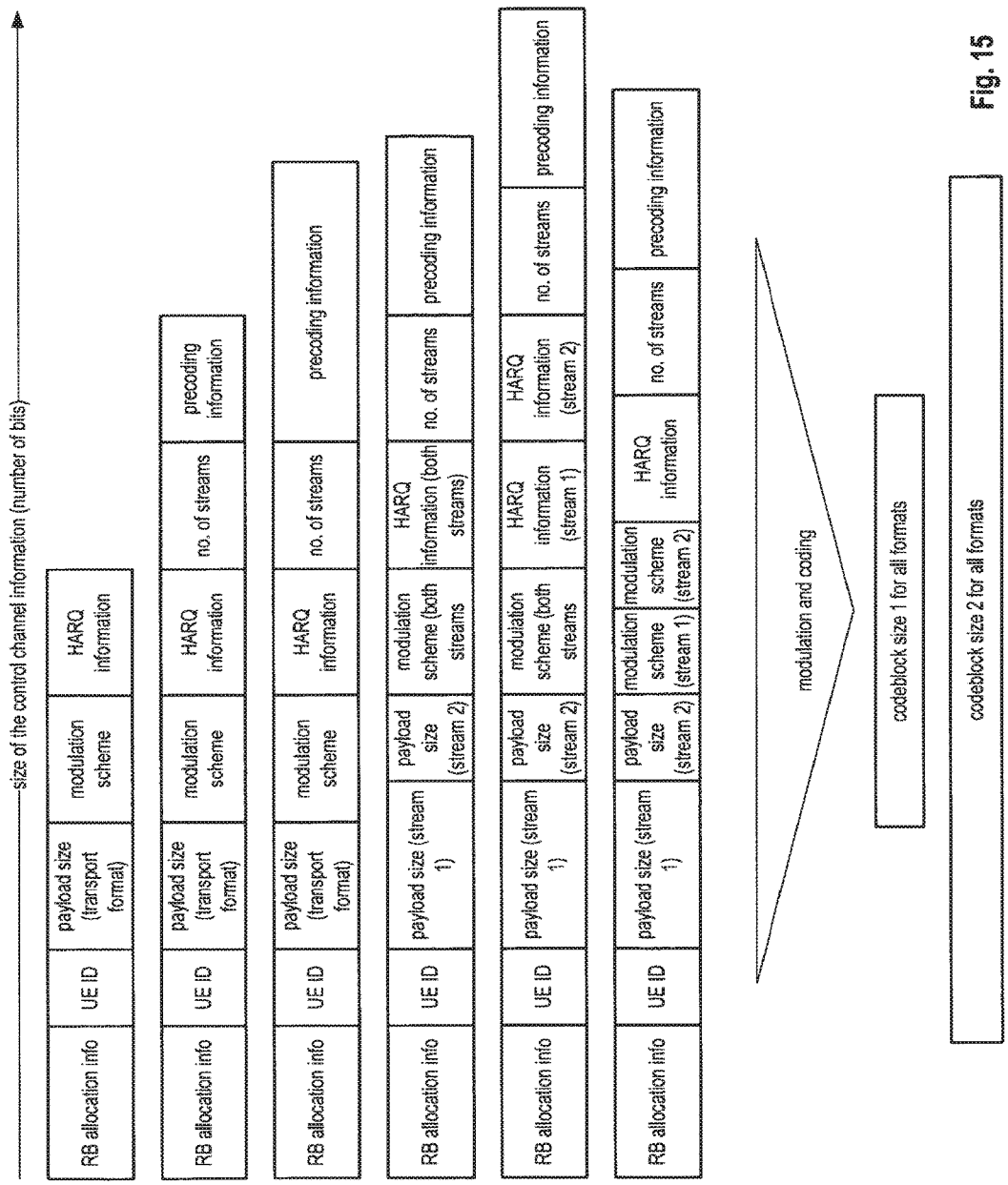
FIG. 15 shows several different formats of control channel information and their mapping to two different codeblock sizes by means of modulation and coding according to an exemplary embodiment of the invention.

Each of the control channel information has a certain format (or structure), i.e., the control information may comprise different fields and parameters. In one embodiment, the control information may have the formats as shown in FIG. 14, FIG. 15 and Table 14 or as in Table 1 and Table 2 in the Technical Background section. Due to the different formats, it may be also assumed that each of the formats of the control channel information has a different size in terms of the number of bits.

Another embodiment of the invention considers the design of a communication scheme for control channels for the system bandwidth agnostic design for LTE. This system bandwidth design is exemplarily shown in Table 7 below (see also 3GPP Tdoc. R1-074906 mentioned previously herein):

TABLE 7

| BW | 1.4 MHz | 1.6 MHz | 3 MHz | 3.2 MHz | 5 MHz | 10 MHz | 15 MHz | 20 MHz | 22 MHz |
|---|---|---|---|---|---|---|---|---|---|
| RBs | 6 | 7 | 15 | 16 | 25 | 50 | 75 | 100 | 110 |
| Payload Size 1 [35 bit] | UL DL-BF/ OLT DL-SU1 | UL DL-BF/ OLT | | | | | | | |
| Payload Size 2 [39 bit] | | DL-SU1 | | UL DL-BF/ OLT DL-SU1 | UL DL-BF/ OLT | UL DL-C | | | |

TABLE 7-continued

| BW | 1.4 MHz | 1.6 MHz | 3 MHz | 3.2 MHz | 5 MHz | 10 MHz | 15 MHz | 20 MHz | 22 MHz |
|---|---|---|---|---|---|---|---|---|---|
| Payload Size 3 [43 bit] | DL-MU DL-SU2 | DL-MU DL-SU2 | | | DL-SU1 | DL-BF/ OLT | UL DL-C | UL DL-C | UL DL-C | UL DL-C |
| Payload Size 4 [49 bit] | | | DL-MU DL-SU2 | DL-MU DL-SU2 | DL-SU1 DL-MU | DL-BF/ OLT DL-SU1 | DL-BF/ OLT | | |
| Payload Size 5 [56 bit] | | | | | DL-SU2 | DL-MU DL-SU2 | DL-SU1 DL-MU DL-SU2 | DL-BF/ OLT | |
| Payload Size 6 [65 bit] | | | | | | | | DL-SU1 DL-MU DL-SU2 | DL-BF/ OLT DL-SU1 DL-MU DL-SU2 |

As can be seen from Table 7 a given format (e.g., Format DL-C) has different control channel information sizes, depending on the system bandwidth. This is caused by the Resource Block (RB) allocation field being system bandwidth dependent, which causes that different formats, e.g., Format UL (or Format DL-C) and Format DL-SU2, having different sizes for the same system bandwidth, to have the same control channel information size for different system bandwidths. E.g., for system bandwidths of 10 MHz (50 RBs) and larger, the Format UL (or Format DL-C) is mapped on control channel information size (payload) size 3. The same size is used for Format DL-SU2 (and also Format DL-MU) for system bandwidths of 1.4 and 1.6 MHz.

Similarly, the Format DL-SU2 (and also Format DL-MU) for system bandwidths of 3.0 and 3.2 MHz is mapped on payload size 4, which is also used for the Format DL-BF/OLT for system bandwidths of 10 and 15 MHz.

Additionally, the Format DL-SU2 for system bandwidths of 5 to 15 MHz is mapped on payload size 5, which is also used for the Format DL-BF/OLT for a system bandwidth of 20 MHz.

Applying the principles introduced in Tables 5 and 6 (formats being mapped on the same size being mapped on different CCE aggregation sizes) across different system bandwidths, e.g., a mapping as shown in Table 8 below, may be defined.

In another embodiment of the invention, the size of the CCEs may depend on the system bandwidth, where the size typically increases with increasing system bandwidth.

Examples are shown in Tables 9 and 10. Applying the CCE numerology from Table 9 to the formats and CCE aggregation sizes from Table 8 will yield different code rates as shown in Table 11. As can, for example, be seen for the DL-SU2 format, the same CCE aggregation sizes (2 and 4) are used for this format in all system bandwidths. This feature may simplify the base station and UE operation in that the blind detection of the control channel format is simplified due to the limited number of CCE aggregations sizes to which the format may be mapped.

TABLE 8

| Code Rate | | Payload format (System BW) | CCE Aggregation Sizes | | | |
|---|---|---|---|---|---|---|
| | | | 8 CCE (288 REs) | 4 CCE (144 REs) | 2 CCE (72 REs) | 1 CCE (36 REs) |
| Payload Size | Size 3 [42 bit] | DL-SU2 (1.4/1.6 MHz) | 0.07 | 0.15 | 0.29 | 0.58 |
| | | DL-C (>= 10 MHz) | 0.07 | 0.15 | 0.29 | 0.58 |
| | | UL (>= 10 MHz) | 0.07 | 0.15 | 0.29 | 0.58 |
| | Size 4 [49 bit] | DL-SU2 (3/3.2 MHz) | 0.08 | 0.17 | 0.34 | 0.68 |
| | | DL-BF/OLT (10-15 MHz) | 0.08 | 0.17 | 0.34 | 0.68 |
| | Size 5 [58 bit] | DL-SU2 (5-15 MHz) | 0.10 | 0.20 | 0.40 | 0.81 |
| | | DL-OLT (20 MHz) | 0.10 | 0.20 | 0.40 | 0.81 |

TABLE 9

| BW | 1.4 MHz | 1.6 MHz | 3 MHz | 3.2 MHz | 5 MHz | 10 MHz | 15 MHz | 20 MHz | 22 MHz |
|---|---|---|---|---|---|---|---|---|---|
| RBs | 6 | 7 | 15 | 16 | 25 | 50 | 75 | 100 | 110 |
| CCE size [REs] | 24 | 24 | 24 | 24 | 24 | 36 | 36 | 36 | 36 |

TABLE 10

| BW | 1.4 MHz | 1.6 MHz | 3 MHz | 3.2 MHz | 5 MHz | 10 MHz | 15 MHz | 20 MHz | 22 MHz |
|---|---|---|---|---|---|---|---|---|---|
| RBs | 6 | 7 | 15 | 16 | 25 | 50 | 75 | 100 | 110 |
| CCE size [REs] | 16 | 16 | 20 | 20 | 24 | 36 | 36 | 48 | 48 |

TABLE 11

| | | | CCE Aggregation Size | | | |
|---|---|---|---|---|---|---|
| | | | 8 CCE | 4 CCE | 2 CCE | 1 CCE |
| | | Payload | (192, 288 | (96, 144 | (48, 72 | (24, 36 |
| | Code Rate | (System BW) | REs) | REs) | REs) | REs) |
| Payload Size | Size 3 [42 bit] | DL-SU2 (1.4/1.6 MHz) | 0.11 | 0.22 | 0.44 | 0.88 |
| | | DL-C (>= 10 MHz) | 0.07 | 0.15 | 0.29 | 0.58 |
| | | UL (>= 10 MHz) | 0.07 | 0.15 | 0.29 | 0.58 |
| | Size 4 [49 bit] | DL-SU2 (3/3.2 MHz) | 0.13 | 0.26 | 0.51 | 1.02 |
| | | DL-BF/OLT (10-15 MHz) | 0.08 | 0.17 | 0.34 | 0.68 |
| | Size 5 [58 bit] | DL-SU2 (10-15 MHz) | 0.10 | 0.20 | 0.40 | 0.81 |
| | | DL-OLT (20 MHz) | 0.10 | 0.20 | 0.40 | 0.81 |

Table 12 provides another example applying the CCE numerology from Table 10 to the formats and CCE aggregation sizes from Table 8.

Concerning the processing of the control channel information at the transmitting entity, the control channel information of a respective control channel is first subject to

TABLE 12

| | | | CCE Aggregation Size | | | |
|---|---|---|---|---|---|---|
| | | | 8 CCE | 4 CCE | 2 CCE | 1 CCE |
| | | | (128, 160, | (67, 80, | (32, 40, | (16, 20, |
| | | Payload | 192, 288, | 96, 144, | 48, 72, | 24, 36, |
| | Code Rate | (System BW) | 384 REs) | 192 REs) | 96 REs) | 48 REs) |
| Payload Size | Size 3 [42 bit] | DL-SU2 (1.4/1.6 MHz) | 0.16 | 0.33 | 0.66 | 1.31 |
| | | DL-C (>= 10 MHz) | 0.07 | 0.15 | 0.29 | 0.58 |
| | | UL (>= 10 MHz) | 0.07 | 0.15 | 0.29 | 0.58 |
| | Size 4 [49 bit] | DL-SU2 (3/3.2 MHz) | 0.15 | 0.31 | 0.61 | 1.23 |
| | | DL-BF/OLT (10-15 MHz) | 0.08 | 0.17 | 0.34 | 0.68 |
| | Size 5 [58 bit] | DL-SU2 (10-15 MHz) | 0.10 | 0.20 | 0.40 | 0.81 |
| | | DL-OLT (20 MHz) | 0.08 | 0.15 | 0.30 | 0.60 | coding and modulation by means of a coder and a modulator. The coder codes the control channel information at a given coding rate (e.g., in the range of 0.1 to 1). Different coding rates might, e.g., be generated by puncturing and repetition of the output bits of a coder with a given mother code rate. The coded bits (also referred to as coded control channel information herein) are then subjected to modulation on a modulator. The modulator receives groups of coded bits (so-called codewords) or forms the codewords out of the input coded bits. Each codeword is then mapped by the modulator to a modulation symbol. The number of coded bits of a codeword thereby depends on the modulation scheme level (for an M-bit codeword a modulation scheme with $2^M$ distinct modulation symbols is needed). For example, the modulator may use a modulation scheme such as BPSK, QPSK, 16 QAM, 64 QAM or the like. The modulator outputs modulation symbols. For example, the modulation symbols are characterized by inphase and quadrature component in the I- and Q-plane.

As explained previously, each control channel information format may be associated to at least one modulation and coding scheme. A modulation and coding scheme typically comprises a coding rate to be employed by the coder and a modulation scheme to be applied by the modulator. The modulation and coding scheme(s) associated to the respective control channel information formats is chosen so as to align the size of the control channel information of different formats to an equal number (or equal numbers) of coded control channel information bits and/or modulation symbols for each control channel.

Hence, in this example, the modulators modulating the coded bits of the two control channels output an equal number of modulation symbols. The modulation symbols may next be multiplexed by a multiplexer and are subsequently processed by an OFDM modulation section that outputs OFDM symbols. These OFDM symbols carry the information of the control channels and are subsequently mapped to the physical channel resources, e.g., as shown in FIG. 4, for transmission.

At the receiver side (here, at the mobile stations) a respective one of the OFDM symbols is demapped from the physical channel resources at a time instance and is provided to an OFDM demodulation section that demodulates the OFDM symbols to obtain a set of modulation symbols. The demultiplexer demultiplexes the modulation symbols and thereby tries to recover the individual control channels. The demultiplexed modulation symbols of a respective control channel are then provided to a demodulator that demodulated the symbols to generate a series of codewords. These codewords are then provided to a decoder that tries to recover the control channel information of the respective control channel.

In this exemplary embodiment, it is assumed that the modulation and coding scheme for the control channels is not known to the receiving entities (except for the receiving entities being aware of the association between modulation and coding schemes and the respective control channel formats, but not of the actual control channel information formats on the channels). Hence, a receiving entity may perform a blind detection of the modulation and coding scheme of the control channels. Generally it should be noted that according to an embodiment of the invention that certain parameters used for OFDM demodulation, demultiplexing, demodulation and decoding may be known to the receiving entities, for example by means of (pre-)configuration; however, not all parameters necessary to revert the physical layer processing are available so that in some steps of the physical channel processing the receiver have to find out the appropriate parameters in trial-and-error fashion, i.e., blind detection.

One example for blind detection is that the receiver (mobile station) demodulates the received signal and tries to decode the control channels using one of the different modulation and coding schemes that have been defined for the control channel information formats. A mechanism for blind detection for use in one embodiment of the invention is similar to that specified in sections 4.3.1 and Annex A in 3GPP TR 25.212: "Multiplexing and channel coding (FDD)," Release 7, v. 7.1.0, June 2006 and in 3GPP TSG-RAN WG1 #44 R1-060450, "Further details on HS-SCCH-less operation for VoIP traffic," February 2006 or 3GPP TSG-RAN WG1 #44bis R1-060944 "Further Evaluation of HS-SCCH-less operation," March 2006 (all three documents available at http://www.3gpp.org and being incorporated herein by reference).

Figure 9:
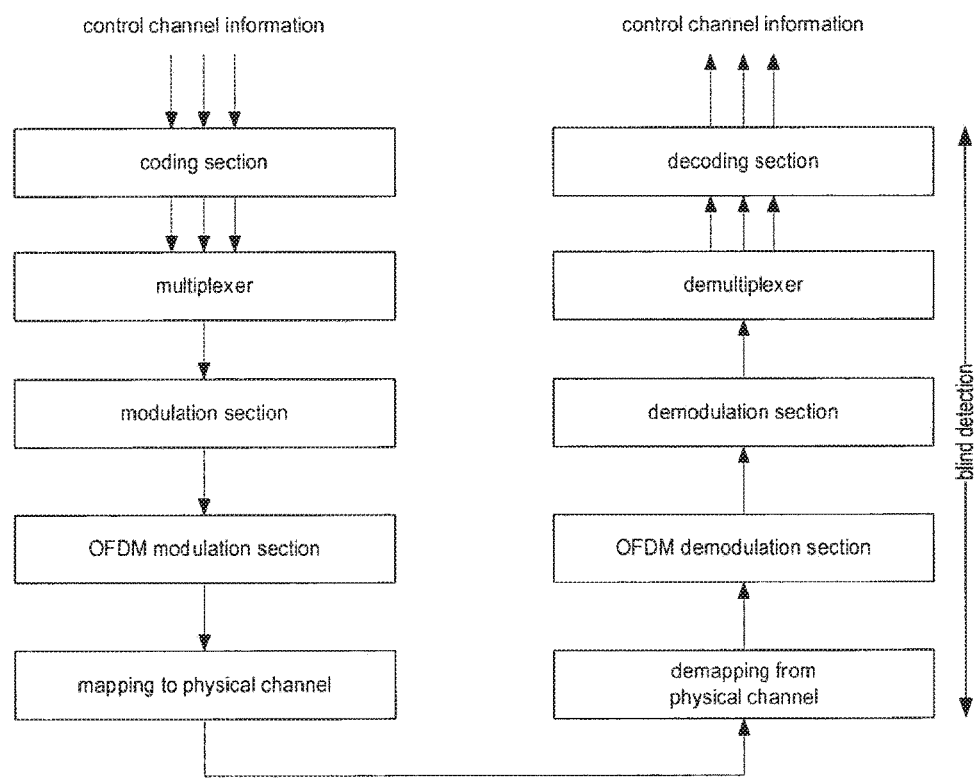

FIG. 9 shows another exemplary structure of the processing of control channel information of plural control channels on the physical layer according to an embodiment of the invention. Essentially, the same processing steps as in FIG. 8 are provided for the control channels.

The control channel information of the respective control channels are individually encoded by means of a coder (coding section) first. Similar to FIG. 8, there may be a rate matching unit between the coding section and the modulator for adapting the coding rate of the coding section to a desired coding rate (e.g., by puncturing or repetition). In contrast to the physical layer processing in FIG. 8, the coded bits of the channels output by the coding are multiplexed in this embodiment and the multiplexed coded bits of the control channel are subjected to modulation in a modulation section. Hence, in this exemplary embodiment, the modulation scheme for all control channels is the same. Accordingly, in order to align the align the size of the control channel information of different formats, the coding rate of the modulation and coding scheme associated to a respective control channel has to be selected so that the coding section outputs an equal number of coded control channel information for each of the control channels. (Due to the use of the same modulation scheme for all control channels in this example, the modulation of the coded bits of each control channel will thus result in an equal number of modulation symbols/resource elements for each control channel as well.)

The modulation symbols for the control channels output by the modulation section are then subject to OFDM modulation and physical channel mapping as explained previously with respect to FIG. 8. Accordingly, the reverse processing on the receiver side is similar to the one explained for FIG. 8 except for the demodulation of the symbols will provide a stream comprising codewords of all control channels, which has to be demultiplexed so as to obtain the codewords of the respective control channels. The codewords of the respective control channels are subsequently tried to be decoded to recover the control channel information of the respective control channels.

Alternatively, multiplexing at the transmitter may also be performed after modulation. Accordingly, also the receiver must be adapted accordingly to perform demultiplexing prior to decoding. Furthermore, in another embodiment of the invention, additional steps may be performed at the transmitter prior to the physical channel mapping, such as scrambling, interleaving, etc. Similar measures to revert the effect of the respective steps are to be foreseen at the receiver accordingly. Moreover, in case the control channels are mapped onto CCEs, there may be additional steps related to the CCE mapping and multiplexing at the transmitter, and respective steps (demultiplexing and demapping) at the receiver.

Figure 10:
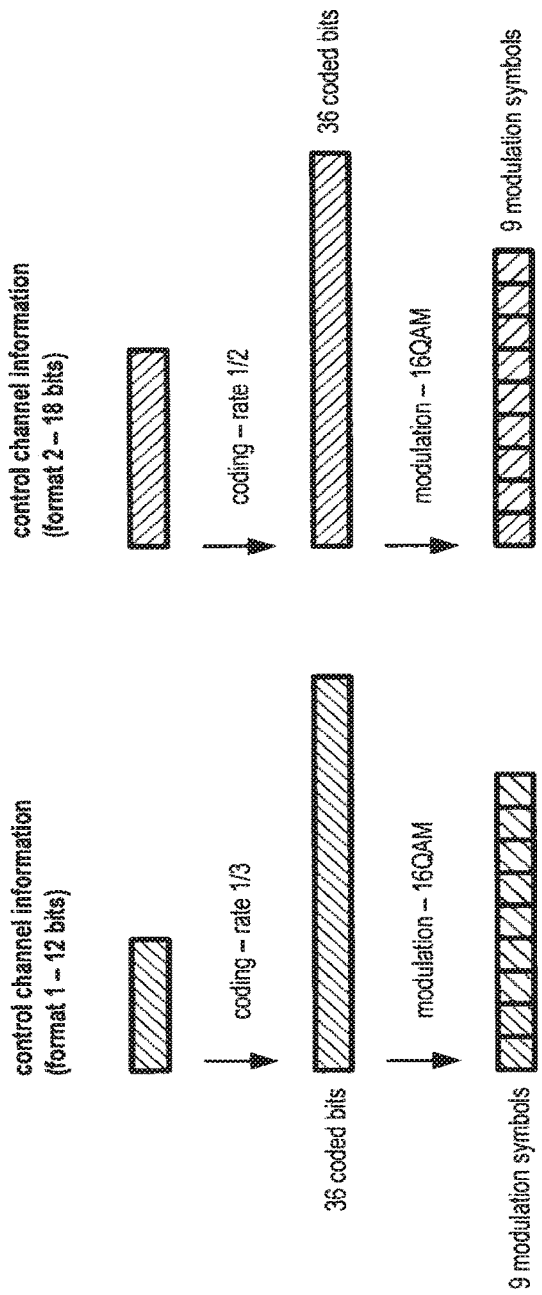
FIG. 10 shows, in accordance with an exemplary embodiment of the invention, the use of two different modulation and coding schemes having a common modulation scheme for aligning the number of coded control information bits of the control channel information of control channels, where the control channel information have different formats.

FIG. 10 shows, in accordance with an exemplary embodiment of the invention, the use of two different modulation and coding schemes having a common modulation scheme for aligning the number of coded control information bits of the control channel information of control channels, where the control channel information have different formats. In this example, two different control channel information formats, format 1 and format 2, with different sizes, are considered for exemplary purposes. Control channel format 1 of a first control channel is assumed to have a size of 12 bits, while control channel format 2 of a second control channel is assumed to have a size of 18 bits. (It should be noted that it may be derived from Table 1 and Table 2 above and from Table 3 as well as FIG. 14 and FIG. 15 that typically the control channel information formats will have more than this rather small number of bits in real-life implementation and that the embodiments described with respect to FIG. 10 to FIG. 13 should be understood as to illustrate the concept). The size of the two different control channel information formats should be aligned in this example. Each of the two formats is associated to a modulation and coding scheme for this purpose. Format 1 is associated to a modulation and coding scheme {coding rate: ⅓; modulation scheme: 16 QAM} and Format 2 is associated to a modulation and coding scheme {coding rate: ½; modulation scheme: 16 QAM}. Accordingly, the modulation scheme of the control channels may, for example, be pre-configured in this example. Hence, in order to align the size of the control channel information, the coding rate of the respective modulation and coding schemes for format 1 and format 2 have been selected so that an equal number of coded bits is obtained by coding. The 12 bits of format 1 are coded at a code rate of ⅓ resulting in a 36 coded bits. Similarly, the 18 bits of format 2 are coded at a code rate of ½ so that also 36 coded bits are obtained.

As a 16 QAM modulation is used, codewords of 4 bits are mapped to a single modulation symbol by modulation. Hence, when modulating the 36 coded bits of the respective control channels 9, modulation symbols are obtained for each control channel in this example. It should be noted that there may be of course more than two control channels provided for transmission at a given time instance and that there may also be more than two formats of the control channel information provided. Accordingly, a modulation and coding scheme for each format of the control channel information (given that the formats differ in size) should be provided.

In a further embodiment of the invention, at least two control channel information formats out of the possible control channel information formats have the same size. Accordingly, to map these at least two control channel information to a an equal number of coded bits or modulation symbols, it has to be taken care that the modulation and coding schemes for these equal-sized format differ from each other.

If however one parameter of the modulation scheme is to be used for all formats (for example, a common modulation scheme is to be used for all control channels irrespective of the format), this will yield the same modulation and coding scheme for these control channel information formats of equal size. Hence, to be still able to identify the correct control channel format, in another embodiment, the receivers may decode the control channel information and may compare the resulting control channel information against the equal-sized formats to identify the correct format. Alternatively, in another embodiment, it may be advantageous to include a format identifier (e.g., control channel information format field) to the control channel information or to the coded bits (by the coder) so as to uniquely identify the control channel information format. It should be noted that a control channel format identifier may be also used by default, i.e., irrespective of whether there exist control channel formats of equal size or not or of whether the control channel information formats are mapped to different numbers of coded bits or modulation symbols.

If all control channel information formats have a different size (in terms of number of bits) the modulation and coding schemes for the respective formats will all be different, so that no identifier would be needed.

Additionally, selected control channel information formats may have the same size, however, a given mobile station may not need to decode all formats. Instead, the mobile station may only use a single one. In this case, a format identifier is not required. This could, for example, be realized by pre-configuring a mobile station (UE) to receive only control channels for downlink single-user MIMO mode. Accordingly, the mobile station does not need to decode other formats, e.g., for non-MIMO or for multi-user MIMO. Thus, even if the size of the formats would be identical, the mobile station needs to know only how to interpret the content of the control channel without a format identifier being required in this case.

Alternatively, if different control channel information formats have the same size, they may be mapped on exclusive CCE aggregation sizes. In this case the format identifier may also not be required, since the format is known from the CCE aggregation size. This is exemplarily shown in Table 13.

TABLE 13

| | | | CCE Aggregation Sizes | | | |
|---|---|---|---|---|---|---|
| | | Format | 8 CCE | 4 CCE | 2 CCE | 1 CCE |
| Control Channel information sizes | Size 1 [35 bit] | Format 1 | ■ | | | |
| | Size 2 [38 bit] | Format 2 | | ■ | | |
| | | Format 3 | | | ■ | |
| | Size 3 [42 bit] | Format 4 | | | | ■ |
| | Size 4 [49 bit] | Format 5 | | ■ | ■ | |
| | | Format 6 | ■ | | | ■ |
| | | Format 7 | | ■ | ■ | |
| | Size 5 [58 bit] | Format 8 | | ■ | | |
| | | Format 9 | ■ | | | |
| | | Format 10 | | ■ | ■ | |
| | Size 6 [67 bit] | Format 11 | | | | ■ |

Alternatively or additionally, in another embodiment of the invention the different control channel formats may also be distinguished by applying different interleaving schemes and/or scrambling to the control channel information, depending on the respective format of the control channel. For example, the different control channel formats may be each associated to different interleaving schemes for the control channel information data. Optionally, there is a unique mapping between a control channel format and a corresponding interleaving scheme, i.e., the control channel formats may be associated to mutually distinct interleaving schemes.

Similarly, the different scrambling codes may, for example, be applied to the control channel information, wherein the applicable scrambling code is chosen based on the control channel format of the control channel information. Optionally, a unique mapping between a control channel format and a corresponding scrambling code may be provided, i.e., the control channel formats may be associated to mutually distinct scrambling codes.

It should be noted that the selected interleaving scheme or scrambling code may additionally depend on other parameters, such as, e.g., the CCE aggregation size, the cell identifier (cell ID) of the radio cell the mobile station (UE) is located in and/or the identifier of the mobile station (UE ID).

Further it should be noted that according to one exemplary embodiment of the invention the different interleaving schemes are obtained using the same interleaving algorithm but initiating the algorithm with different initialization parameter values.

In a similar fashion, the different scrambling codes may, for example, be generated by using a common algorithm for generating scrambling codes and initializing this algorithm with different initialization parameter values depending on the control channel format.

Figure 11:
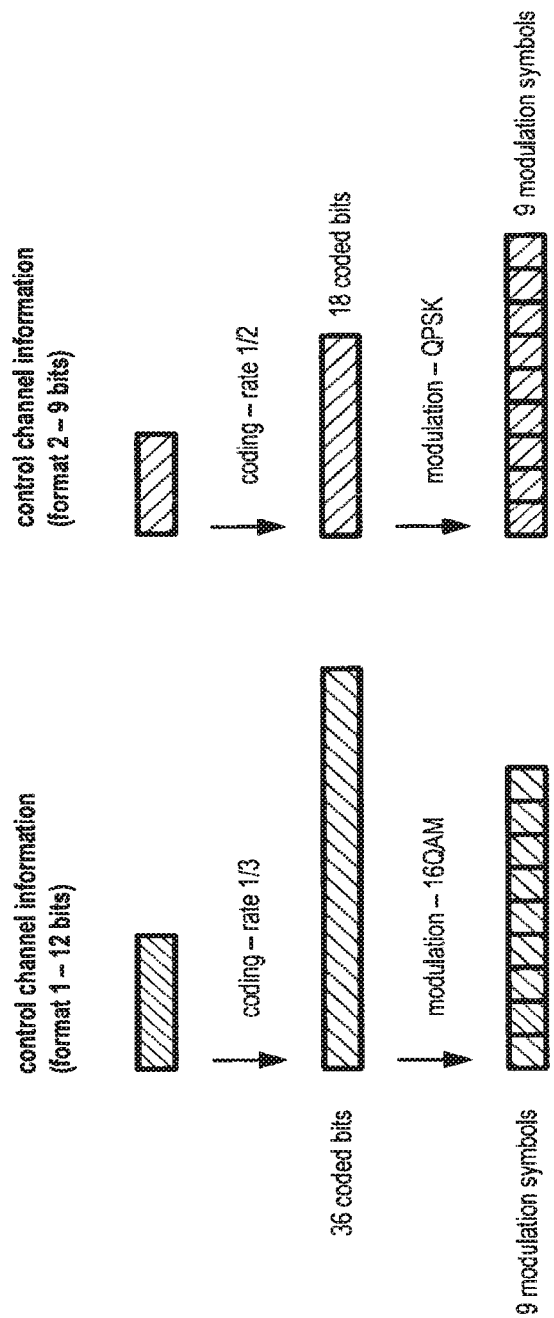
FIG. 11 shows, in accordance with an exemplary embodiment of the invention, the use of two different modulation and coding schemes for aligning the number of modulation symbols of the control channel information of control channels, where the control channel information have different formats.

FIG. 11 shows, in accordance with an exemplary embodiment of the invention, the use of two different modulation and coding schemes for aligning the number of modulation symbols of the control channel information of control channels, where the control channel information have different formats and sizes. In this exemplary embodiment, the modulation scheme for the different formats is not predefined. Accordingly, it is not necessary (but is still possible) that the number of coded bits for the different formats is matched.

In this exemplary embodiment, again, two different control channel formats, format 1 and format 2, are considered for exemplary purposes. Control channel format 1 is associated to a modulation and coding scheme {coding rate: ⅓; modulation scheme: 16 QAM}, while control channel information format 2 is associated to a modulation scheme {coding rate: ½; modulation scheme: QPSK}.

Accordingly, the 12 bits for format 1 are first coded at rate ½ resulting in 36 coded bits. These coded bits are subsequently subjected to a 16 QAM modulation (codeword size: 4 bits) to obtain 9 modulation symbols. Similarly, the 9 bits of format 2 are encoded at rate ½ resulting into 18 coded bits. These coded bits are then subjected to QPSK modulation (codeword size: 2 bits) so that also 9 modulation symbols as for format 1 are obtained.

FIG. 10 and FIG. 11 thus exemplarily illustrate the coding and modulation step in the physical layer processing of the control channels as, for example, shown in FIG. 8. While in the example of FIG. 10 the number of coded bits is matched to a single number of coded bits for all control channel formats, FIG. 11 illustrates an example where the number of modulation symbols for all control channel information formats is matched.

As indicated above, another aspect of the invention is related to a more flexible control channel configuration which may still facilitate blind detection of the control channels on the downlink physical resources without implying a high level of complexity for the receiving entities.

Figure 12:
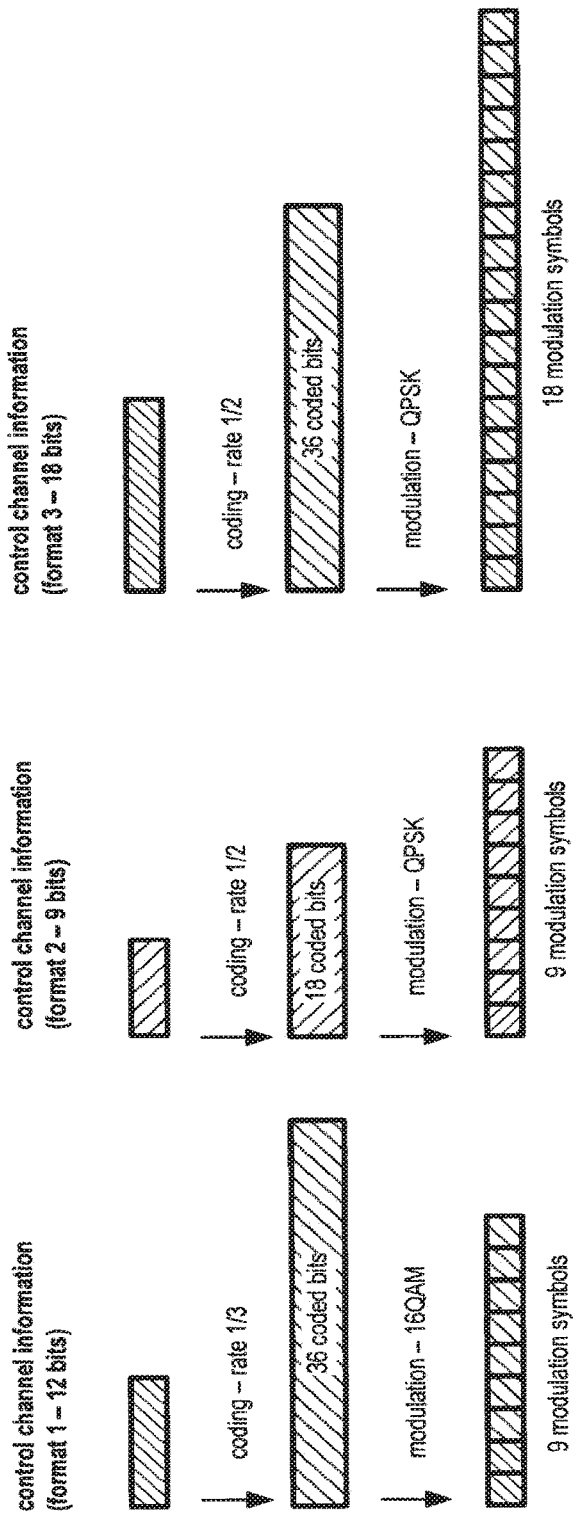
FIG. 12 shows, in accordance with an exemplary embodiment of the invention, the use of different modulation and coding schemes for aligning the number of modulation symbols of the control channel information of control channels to two numbers of modulation symbols, where the control channel information have different formats.

FIG. 12 shows, in accordance with an exemplary embodiment of the invention, the use of different modulation and coding schemes for aligning the number of modulation symbols of the control channel information of control channels to two numbers of modulation symbols, where the control channel information have different formats. In this exemplary embodiment, three different control channel information formats of different size are assumed for exemplary purposes. Control channel information format 1 is assumed to have a size of 12 bits and is associated to a modulation and coding scheme {coding rate: ⅓; modulation scheme: 16 QAM}. Control channel information format 2 is assumed to have a size of 9 bits and is associated to a modulation and coding scheme {coding rate: ½; modulation scheme: QPSK}. Control channel information format 3 is assumed to have a size of 18 bits and is associated to a modulation and coding scheme {coding rate: ½; modulation scheme: QPSK}. Hence, format 2 and format 3 are associated to the same modulation and coding scheme, but the resulting number of modulation symbols will be different due to the different sizes of the two formats.

When applying the modulation and coding scheme of format 1 and format 2 to the respective control channel information, 9 modulation symbols will be obtained for both control channel information format 1 and 2. For control channel information format 3, the coding of its 18 bits at code rate ½ will result in 36 coded bits and the subsequent QPSK modulation will generate 18 modulation symbols. Hence, in this exemplary embodiment, applying a the modulation and coding scheme associated to the different control channel information formats to the control channel information of the control channels will generate either 9 modulation symbols or 18 modulation symbols.

As explained above, there may be various reasons to generate two different numbers of modulation symbols (or coded bits) for different control channel formats. One reason may be that in order to generate 9 modulation symbols for format 3, a modulation scheme of high spectral efficiency would be needed (for example, {coding rate: ½; modulation scheme: 16 QAM}). However, this modulation and coding scheme may be too unreliable for transporting of the control channel information (e.g., due to the channel conditions) or may be a modulation and coding scheme simply not allowed for use with control signaling, so that same may not be used. Hence, a second number of coded bits or modulation symbols to which the control channel information may be matched may be defined.

Though in FIG. 12 the different control channel information formats may be considered to be assigned one modulation and coding scheme, in another embodiment, the different control channel information formats may be assigned to two (or even more) modulation and coding schemes so that selectively different but given/known numbers of coded bits or modulation symbols may be generated for all control channel information formats. For example, there may be three numbers of modulation symbols defined in the system, denoted $M_1$, $M_2$ and $M_3$. Accordingly, the different control channel information formats may be assigned to at least one and at maximum to three different modulation and coding schemes for mapping the control channel information of a respective format to either one of or a combination of $M_1$, $M_2$ and $M_3$ modulation symbols. For example, format 1 may be associated to two modulation and coding schemes mapping the control information of that format to either $M_1$ or $M_2$ modulation symbols, format 2 may be associated to three modulation and coding schemes mapping the control information of that format to either $M_1$, $M_2$ or $M_3$ modulation symbols and format 3 could be associated to two modulation and coding schemes mapping the control information of that format to either $M_2$ or $M_3$ modulation symbols. In one embodiment, the numbers $M_1$, $M_2$ and $M_3$ are selected such that (assuming that $M_1$ is the smallest number) $M_2 = n \times M_1$ and $M_3 = m \times M_1$ (n and m being different positive integer numbers). A CCE may be defined as a set of $M_1$ modulation symbols and, hence, aggregating n (m) CCEs would yield $M_2$ ($M_3$) modulation symbols, Alternatively, the size of a CCE may be defined such that $M_1$ modulation symbols define k CCEs, then aggregating k×n (k×m) CCEs would yield $M_2$ ($M_3$) modulation symbols.

Figure 13:
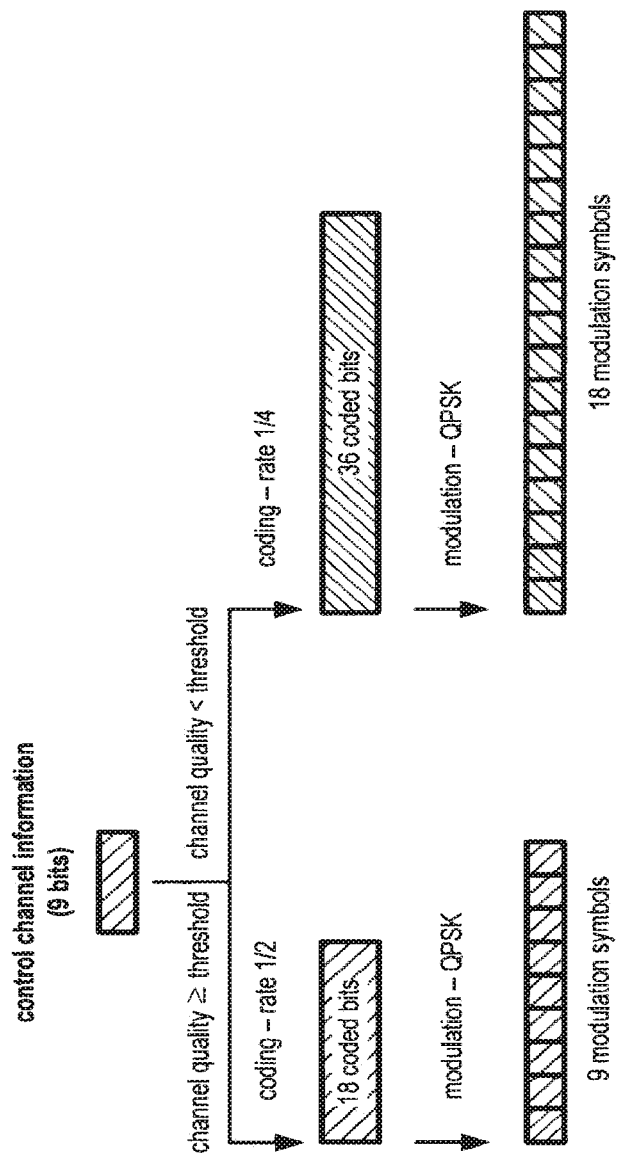
FIG. 13 shows, in accordance with an exemplary embodiment of the invention, the use of different modulation and coding schemes for aligning the number of modulation symbols of the control channel information of a control channel to two numbers of modulation symbols, where the control channel information have different formats, for example based on channel quality information.

This flexible definition of different number of coded bits or modulation symbols to which the different control channel information formats may be matched may allow for using adaptive modulation and coding for the control channels so as to, for example, react to changing channel conditions, as will be explained with respect to FIG. 13 next. FIG. 13 shows, in accordance with an exemplary embodiment of the invention, the use of different modulation and coding schemes for aligning the number of modulation symbols of the control channel information of a control channel to two numbers of modulation symbols (CCEs), where the control channel information have different formats. The decision on whether to map the control channel information to a first number of modulation symbols or a second number of modulation symbols may, for example, be based on the channel quality or geometry of the user for which the control channel information is sent, as mentioned previously. Another parameter for such a decision may also be the format of the control channel information, which is mapped onto a given control channel information size. For example, in this embodiment of the invention, two (or more) modulation schemes may be defined for a control channel format. Depending on the channel quality of the downlink physical channel transporting the control channels, one of the modulation and coding schemes for the formats may be selected respective. For example, if the channel quality is below a certain threshold value, a modulation and coding scheme may be used for the control channel information of a given format that is providing a spectral efficiency/data rate lower than a second modulation and coding scheme for the control channel information of a given format that is to be applied, if the channel quality is above or equal a threshold level. In another embodiment of the invention, adaptive modulation and coding as well as power control may be applied to the L1/L2 control channels, i.e., the L1/L2 control signaling to a mobile station close to the cell center (high geometry/SINR) might be transmitted with low power and/or a high MCS level (smaller number of modulation symbols or CCEs), whereas the L1/L2 control signaling to an MS close to the cell edge (low geometry/SINR) might be transmitted with high power and/or a low MCS level (larger number of modulation symbols or CCEs).

Accordingly, if more than two modulation and coding schemes, i.e., N modulation and coding schemes, are defined for a respective format, there may be N−1 thresholds defined to distinguish the different channel quality level ranges in which the different modulation and coding schemes are to be used. It may be further advantageous, if the modulation and coding scheme level is selected directly proportional to the channel quality, i.e., a lower level modulation and coding scheme (i.e., offering a lower data rate/spectral efficiency) for a poor channel quality and a higher level modulation and coding scheme (i.e., offering a higher data rate/spectral efficiency) for a better channel quality.

FIG. 14 shows several different formats of control channel information and their mapping to a single codeblock size by means of modulation and coding according to an exemplary embodiment of the invention. In FIG. 14 six different exemplary formats of control channel information are shown. Generally, it should be understood that part of the control channel information may be considered a pointer to the location of a data block comprising user data for an individual user within the data part of a sub-frame (or a number of consecutive sub-frames). In other words, the control data may indicate to a user whether and, if applicable, which resource block(s) are assigned to the mobile station (user), which transport format (link adaptation) is used for transmitting the user data destined to the mobile station, etc.

According to some embodiments of the invention, the structure or format of the information carried by the control channels may be separated into the categories shared control information (SCI) and dedicated control information (DCI).

The SC1 part of the control signaling may contain information related to the resource allocation (also referred to as Cat. 1 information). The SCI part may comprise the user identity (UE ID field) indicating the user (or the group of users) being allocated a resource, RB allocation information, indicating the resources (resource block(s)) allocated to the user. The resource allocation field may indicate the resource block(s) that have been allocated for uplink user data transmission on an uplink data channel or, alternatively, the resource block(s) that are to be used for downlink user data transmission to the respective mobile station or group of mobile stations identified by the UE ID field on a shared downlink channel (e.g., the Downlink Shared CHannel (DSCH) for SAE/LTE systems). The number of resource blocks on which a user is allocated can be dynamic. Optionally the SCI may further include an indication of the duration of assignment, if an assignment over multiple sub-frames (or TTIs) is possible in the system.

The DCI part of the control signaling may contain information related to the transmission format (also referred to as Cat. 2 information) of the data transmitted to a scheduled user indicated by Cat. 1 information. Moreover, in case of application of (Hybrid) ARQ, the DCI may also carry retransmission protocol related information (also referred to as Cat. 3 information) such as (H)ARQ information. The DCI needs only to be decoded by the user(s) scheduled according to the Cat. 1 information.

The Cat. 2 information within the DCI may, for example, comprise information on at least one of the modulation scheme, the transport-block (payload) size (or coding rate), MIMO related information, etc. The Cat. 3 information may comprise HARQ related information, e.g., hybrid ARQ process number, redundancy version, retransmission sequence number. It should be noted that either the transport-block size (payload size) or the code rate can be signaled in the Cat. 2 information. In any case payload size and code rate can be calculated from each other by using the modulation scheme information and the resource information (number of allocated resource blocks).

In case a MIMO scheme is used or is to be used for the user data transmission, several information elements in the control channel information may need to be provided for each of the MIMO streams. Accordingly, some of the information elements may be provided several times in the exemplary L1/L2 control information, e.g., for each MIMO stream. Further, it may also be possible that some of the different parameters (such as payload size, modulation scheme, etc.) are to be used by all or a subset of the MIMO streams.

The first exemplary format shown in FIG. 14 is a simple control channel information format, which may be used on control channels for users utilizing no specific MIMO scheme (e.g., SISO—Single Input Single Output, or simple transmit and/or receive diversity schemes, which do not require additional antenna related information). This format may, for example, only comprise RB allocation information, an identification of the user(s) for which the control information is intended (e.g., by means of the UE ID field or by an implicit identification such as a UE specific CRC), the payload size (respectively transport format—as explained above), the modulation scheme and HARQ information.

The second exemplary format may, for example, be used for user data transmissions to employ a MIMO scheme. Similar to the first format shown in FIG. 14, also this format comprises RB allocation information, an identification of the user(s) for which the control information is intended, the payload size (respectively transport format), the modulation scheme and HARQ information. Further, the format may include additional information elements indicating the number of MIMO streams and precoding information (e.g., number of MIMO streams and a precoding vector or an index value pointing to a preconfigured precoding vector). As only one "set" of information elements relating to payload size, modulation scheme and HARQ information, this may mean that all streams indicated in the number of streams field use the same payload size and modulation scheme and that all streams may be handled by a single HARQ process. Alternatively, the payload size, modulation scheme, etc. only configure a subset (e.g., one) of the multiple streams and information on additional streams is transmitted separately.

The third control channel information format shown in FIG. 14 comprises the same information elements as the second example, except for the assumption that more precoding related information are included in the control information (e.g., larger precoding vector, e.g., index reflecting a larger index space).

The next, fourth example of a control channel information format also relates to the use of a 2-stream MIMO scheme. In this example, the different payload sizes are used for the respective MIMO streams, so those two payload size fields are included in the format. Similar to the previous examples, the same modulation scheme may be used for both MIMO streams and the streams may be handled by a single HARQ process. Alternatively, the modulation and HARQ information may configure a single stream and information on the second stream is transmitted separately, e.g., on another control channel.

The fifth exemplary format in FIG. 14 is essentially similar to the fourth example, except for the use of two separate HARQ processes for the respective streams of the MIMO scheme. Similarly, the sixth exemplary L1/L2 control information format shown in FIG. 14 assumes two different payload sizes and modulation schemes for the two MIMO streams, while both streams are handled by a single HARQ process.

In general the control channel information may contain partial or full information for multiple MIMO streams for various MIMO configurations.

As can be recognized from the exemplary control channel information shown in FIG. 14, the format of the control information on the control channels may vary depending on the configuration used for user data transmission. Accordingly, the different formats may not only differ in their content, i.e., the information elements contained in the respective format and/or the size (in terms of number of bits) of the formats. The control channel information format may, for example, depend on at least one of the following parameters:

- the control channel's relation to a MIMO scheme or beamforming scheme utilized or to be utilized for the transmission of user data,
- the control channel's relation to uplink or downlink transmission of user data,
- the control channel's relation to a utilization of localized mode or distributed mode OFDM transmission for the transmission of user data.

It should be noted that the examples shown in FIGS. 14 and 15 are intended to exemplarily visualize on an abstract level that there may be various different control channel formats resulting in different control channel information sizes. There may be additional fields defined for certain formats (e.g., power control commands for different channels, multi-user MIMO related information, format identifiers, etc.), which are not shown.

Moreover, some fields may be omitted, since their information can be derived from other fields (e.g., because the fields are merged into other fields or because related information is signaled on a different channel or is pre-configured). Some examples on how individual parameters of the control channel information may be derived from each other are exemplarily listed below:

- The modulation scheme information may be derived from the payload size and the RB allocation info
- The HARQ information may not be required for certain control channel formats
- The number of MIMO streams may be derived from some other control channel fields and/or may be pre-configured In addition, certain fields of the control channel information may have different sizes in different control channel formats, e.g.:

- The RB allocation information field may be smaller for the first format in order to keep this control channel format as small as possible (to improve coverage, as a small format size yields a lower coding rate/higher coding gain). This may, however, cause some restrictions in the flexibility of the RB allocation.
- For an uplink related control channel, the RB allocation information field may be smaller than for some downlink related control channels Hence, as indicated in FIG. 14, a modulation and coding scheme for the respective control channels may be chosen based on the format of the control information on the respective control channel so as to align the size of the control channel information on the physical resource. According to another embodiment, the different control channel formats as shown in FIG. 14 and FIG. 15 may also be mapped to two different codeblock sizes (i.e., the number of coded control information bits) as shown in FIG. 15.

The subsequent table shows an exemplary definition and overview of the content of the control channels according to an exemplary embodiment of the invention. It should be noted that the size of the respective fields is only mentioned for exemplary purposes.

TABLE 14

| Field | | Size | Comment |
| --- | --- | --- | --- |
| Cat. 1 (Resource | ID (UE or group specific) | 8 | Indicates the UE (or group of UEs) for which the data transmission is |

TABLE 14-continued

| Field | | | Size | Comment |
|---|---|---|---|---|
| indication) | | | | intended; the indication may be implicit, e.g., in form of a CRC |
| | Resource assignment | | 6 | Indicates which (virtual) resource units (and layers in case of multi-layer transmission) the UE(s) shall demodulate. |
| | Duration of assignment | | 2 | The duration for which the assignment is valid, could also be used to control the TTI or persistent scheduling. |
| Cat. 2 (transport format) | Multi-antenna related information | | 0-20 | Content depends on the MIMO/beamforming schemes selected. |
| | Modulation scheme | | 2 | QPSK, 16QAM, 64QAM. In case of multi-layer transmission, multiple instances may be required. |
| | Payload size | | 6 | Interpretation could depend on, e.g., modulation scheme and the number of assigned resource units (c.f HSDPA). In case of multi-layer transmission, multiple instances may be required. |
| Cat. 3 (HARQ) | If asynchronous hybrid ARQ is adopted | Hybrid ARQ process number | 3 | Indicates the hybrid ARQ process the current transmission is addressing. |
| | | Redundancy version | 2 | To support incremental redundancy. |
| | | New data indicator | 1 | To handle soft buffer clearing. |
| | If synchronous hybrid ARQ is adopted | Retransmission sequence number | 2 | Used to derive redundancy version (to support incremental redundancy) and 'new data indicator' (to handle soft buffer clearing). |

Other embodiments of the invention relate to limiting the number of blind detection trials so as to further reduce the complexity of the control channel configuration. In order to limit/reduce the number of blind detection trials to be carried out by the receiver (mobile station, UE), a receiver may, for example, try to detect only a subset of possible defined formats and sizes (resources) of the L1/L control signaling.

This may require some configuration. An according configuration should mainly affect the receiver, but may—in some cases—also affect the transmitter.

In one exemplary embodiment, the receiver is configured such that it tries to receive a subset of formats and/or a subset of sizes (MCS levels for certain formats) only. The receiver may be additionally or alternatively configured such that it tries to receive control channels on only some of the physical resources used for control channels.

In one exemplary scenario, a receiver may be preconfigured in a MIMO mode 1 for downlink and therefore only tries to receive the format defined for MIMO mode 1. Additionally, this mobile station may only try to receive a certain codeblock size for this MIMO mode 1 format of the control channel information. Further, the mobile station may also try to receive this MIMO mode 1 format on only a subset of the control channel resources.

In another exemplary scenario, a mobile station may be active in uplink and downlink. This mobile station may thus receive uplink related control channels on a first subset of the overall control channel resources and may also receive downlink related control channels on a second subset of the overall control channel resources.

In most cases this operation may imply that the transmitter has limited flexibility in terms of mapping certain control channel formats on certain resources only. This can be seen as a transmitter configuration. Generally, the transmitter flexibility may be limited by the receiver (UE) complexity (number of possible blind detection trials).

In one exemplary embodiment of the invention, the configuration of the receivers is preformed by the network (transmitter). The configuration may be common information to all receivers that may be broadcast by the access network. Alternatively, the configuration may be dedicated to an individual receiver or a group of receivers. In this alternative, dedicated signaling may be used to transmit the configuration to the receiver(s). The common configuration may, for example, be transmitted in a broadcast channel and the dedicated information may, for example, be transmitted on a dedicated or shared channel. In some cases, a combination of common and dedicated configuration might be used. E.g., a receiver may be initialized with a baseline common configuration (by broadcast) and may be reconfigured by dedicated signaling.

Further, the configuration might be carried out dynamically per sub-frame. In one exemplary embodiment, a so-called Cat. 0 control channel might be configured in the communication system in order to provide information on the currently transmitted control channel formats, sizes and/or resources. For example, in a given sub-frame, the Cat. 0 information may indicate that only control channels related to uplink user data transmissions (or alternatively downlink user data transmission) are transmitted so that only the interested receivers may need to receive the control channels. In another example, the Cat. 0 information may indicate that the control channels only contain control channel information (and thus respective control channel formats) for specific MIMO modes. In another example, the Cat. 0 control information may indicate that control channels are only transmitted on certain control channel resources, or may indicate that control channels convey only control channel information of certain sizes.

The Cat. 0 information does not necessarily need to be transmitted every sub-frame. It may also be transmitted on a longer time scale and the contained information may be valid for a certain time period.

Concerning the embodiments of the invention where multiple codeblock sizes out of a single control channel format may be generated (see, for example, FIG. 7, FIG. 12, FIG. 13 and FIG. 15) it may be possible to consider the geometries/SINR (Signal to Interference-plus-Noise Ratio) state of the mobile stations. For example, mobile stations MS1 and MS2 may, for example, be located at the cell edge of a radio cell which is assumed to imply that radio channel quality is lower compared to mobile stations MS3 and MS4, which are supposed to be located near the radio cell center. In order to securely transmit the control signaling, MS1 and MS2 are thus assigned more resources on the control channel, i.e., a control channel format 1 would be modulated and encoded to generate a larger codeblock (i.e., number of coded control channel information) or larger number of modulation symbols while MS3 and MS4 having better channel quality receive the control signaling with a higher MCS level, i.e., a control channel format 1 would be modulated and encoded to generate a smaller codeblock (i.e., number of coded control channel information) or smaller number of modulation symbols.

Figure 19:
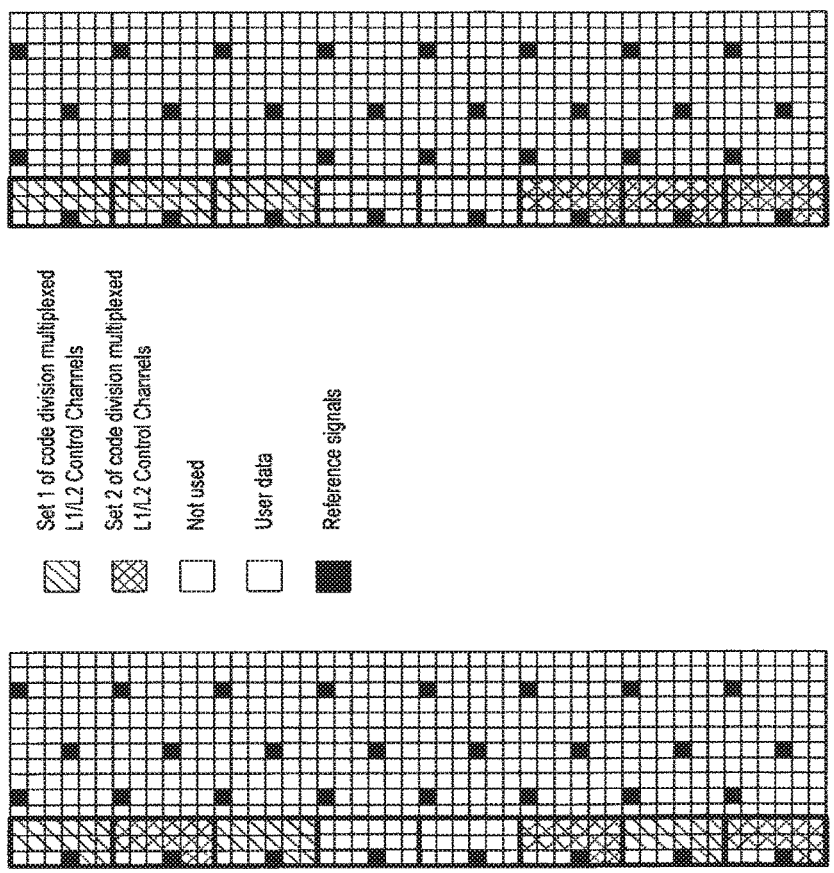
FIG. 19 shows two exemplary resource grids of a sub-frame of an OFDM channel according to different embodiments of the invention, wherein in the left resource grid the control channel are mapped in distributed mode and wherein in the right resource grid the control channel are mapped in localized mode to the OFDM channel resources.

In another embodiment of the invention the control signaling (i.e., control channel information of the control channels) and user data may be multiplexed. This may, for example, be realized by TDM (Time Division Multiplex) as depicted in FIG. 6 and FIG. 7, FDM (Frequency Division Multiplex), CDM (Code Division Multiplex) or scattered the time frequency resources within a sub-frame. Moreover also the different control channels themselves may be multiplexed in CDM, TDM and/or FDM fashion. In one exemplary embodiment, the multiplexing of user data is carried out by a combination of TDM and FDM, i.e., the multiplexing may be performed on a resource element level, whereas control channels are multiplexed by a combination of CDM and FDM. This exemplary embodiment is illustrated in FIG. 19. On the left-hand side of the figure, a resource grid of a sub-frame of an OFDM channel is shown in which the control channels of the two sets are mapped to the physical resource in a distributed mode. On the right-hand side of the figure a resource grid of a sub-frame of an OFDM channel is shown in which the control channels of the two sets are mapped to the physical resource in a localized mode.

Figure 1:
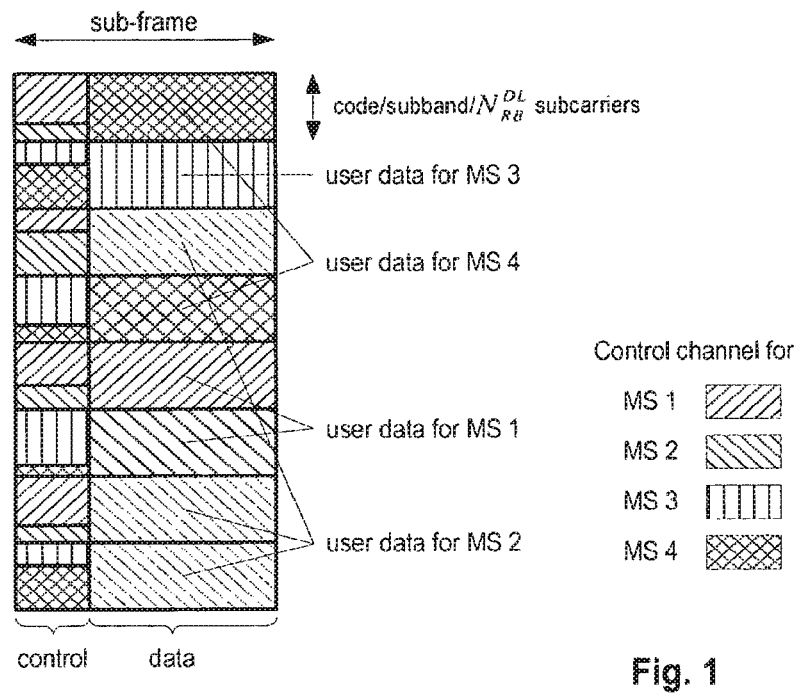
FIG. 1 shows an exemplary data transmission to users in an OFDMA system in localized mode (LM) having a distributed mapping of L1/L2 control signaling.
Figure 2:
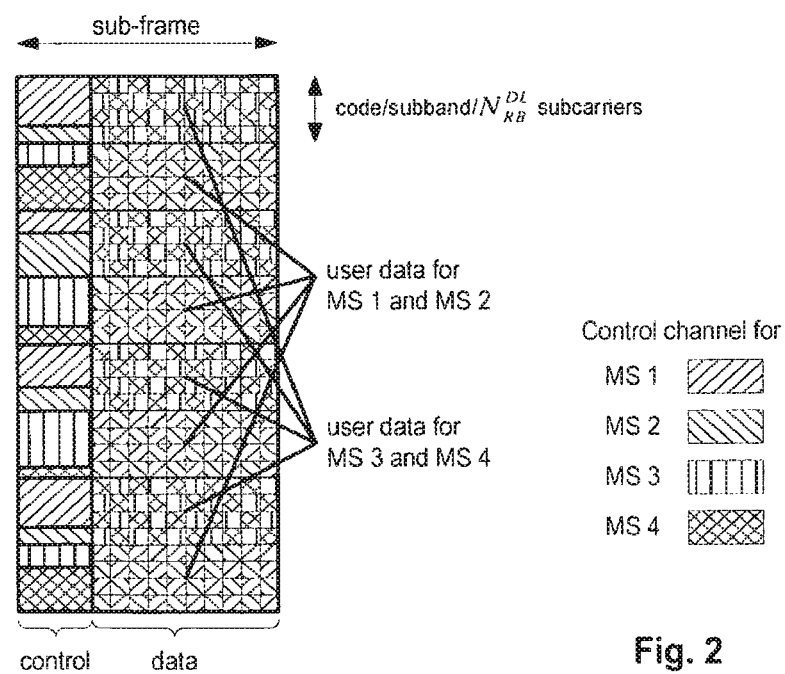
FIG. 2 shows an exemplary data transmission to users in an OFDMA system in distributed mode (DM) having a distributed mapping of L1/L2 control signaling.

In the example in FIG. 1 the L1/L2 control information is signaled on several L1/L2 control channels. According to one exemplary embodiment, the L1/L2 control channels may be mapped on part of the physical resource blocks and are equally distributed on all physical resource blocks. Generally, the mapping of the L1/L2 control channels onto the physical resource blocks might be done in various ways. For example:

The control channels may be equally distributed over all physical resource blocks (as shown in FIG. 1)
  The control channels may be unequally distributed over all physical resource blocks
  The control channels may be (un)equally distributed over selected physical resource blocks (as, for example, shown in FIG. 19)

The individual parts of the L1/L2 control information might be encoded in various ways. According to one exemplary embodiment, Cat. 1, Cat. 2 and Cat. 3 information is encoded jointly for each mobile station. Another option is to encode Cat. 1 separately from Cat. 2 and Cat. 3 information for each mobile station.

Details on the coding and the mapping within a sub-frame of the different categories of L1/L2 control signaling for use in another exemplary embodiment of the invention may also be found in 3GPP RAN WG#1 Tdoc. R1-061672: "Coding Scheme of L1/L2 Control Channel for E-UTRA Downlink," June 2006 available at http://www.3gpp.org and incorporated herein by reference.

In some embodiments of the invention, the (L1/L2) control information is transmitted more reliably than the user data, since correct decoding of the control information may be a prerequisite to start demodulating and decoding of the user data. This typically implies that the target block error rate for the control signaling should be lower than the target block error rate for the user data. In case of employing (hybrid) ARQ, this assumption refers to the target block error rate for the first transmission.

Figure 16:
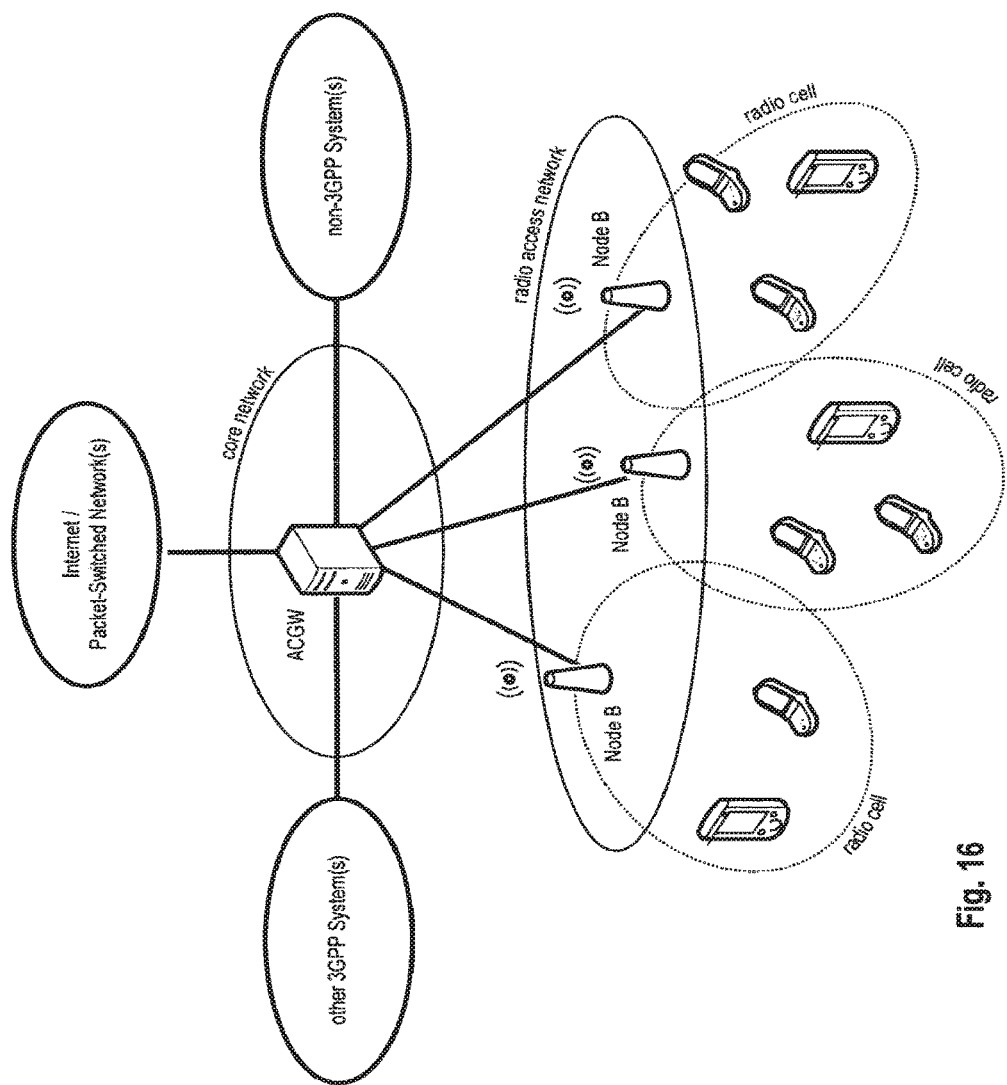
FIG. 16 shows a mobile communication system according to one embodiment of the invention in which the ideas of the invention may be implemented.

Further, it should be noted that the concepts of the invention outlined in various exemplary embodiments herein may be advantageously used in a mobile communication system as exemplified in FIG. 16. The mobile communication system may have a "two node architecture" consisting of at least one Access and Core Gateway (ACGW) and Node Bs. The ACGW may handle core network functions, such as routing calls and data connections to external networks, and it may also implement some RAN functions. Thus, the ACGW may be considered as to combine functions performed by GGSN and SGSN in today's 3G networks and RAN functions as, for example, radio resource control (RRC), header compression, ciphering/integrity protection and outer ARQ. The Node Bs may handle functions as, for example, segmentation/concatenation, scheduling and allocation of resources, multiplexing and physical layer functions. For exemplary purposes only, the eNodeBs are illustrated to control only one radio cell. Obviously, using beam-forming antennas and/or other techniques the eNodeBs may also control several radio cells or logical radio cells.

Figure 3:
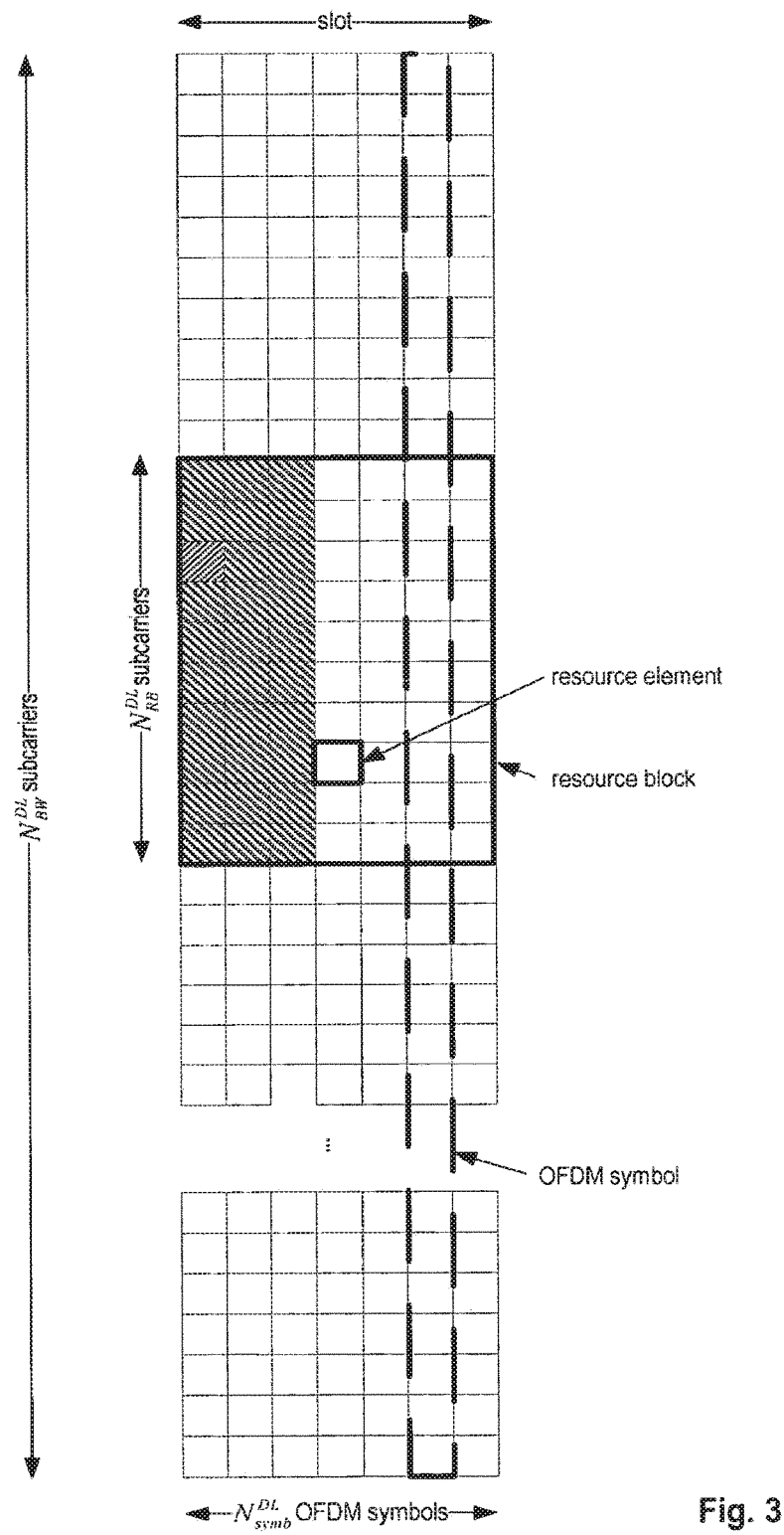
FIG. 3 shows an exemplary resource grid of a slot of an OFDM channel structure according to 3GPP TS 36.211.

In this exemplary network architecture, a shared data channel may be used for communication on uplink and/or downlink on the air interface between mobile stations (UEs) and base stations (eNodeBs). This shared data channel may have a structure as shown in FIG. 3 or FIG. 4. Thus, the channel may be viewed as a concatenation of the sub-frames exemplarily depicted in FIG. 6 or FIG. 7. According to an exemplary embodiment of the invention, the shared data channel may be defined as in the Technological Background section herein, as in 3GPP TR 25.814 or as the HS-DSCH as specified in 3GPP TS 25.308: "High Speed Downlink Packet Access (HSDPA); Overall description; Stage 2," v. 5.3.0, December 2002, available at http://www.3gpp.org and incorporated herein by reference. The shared channel in the downlink may be used to convey the control channels to the individual users (UEs).

Furthermore it should be noted that the different control channel information sizes indicated in the various tables herein are only exemplary. It should be noted that the exact number of bits of the respective formats as well as the number of formats defined for the control channels may be different to the examples shown in the different tables and figures herein. Nevertheless, the principles outlined are equally applicable.

Another embodiment of the invention relates to the implementation of the above described various embodiments using hardware and software. It is recognized that the various embodiments of the invention may be implemented or performed using computing devices (processors). A computing device or processor may, for example, be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example, RAM, EPROM, EEPROM, flash memory, registers, hard disks, CD-ROM, DVD, etc.

In the previous paragraphs various embodiments of the invention and variations thereof have been described. It would be appreciated by a person skilled in the art that numerous variations and/or modifications may be made to the present invention as shown in the specific embodiments without departing from the spirit or scope of the invention as broadly described.

It should be further noted that most of the embodiments have been outlined in relation to a 3GPP-based communication system and the terminology used in the previous sections mainly relates to the 3GPP terminology. However, the terminology and the description of the various embodiments with respect to 3GPP-based architectures is not intended to limit the principles and ideas of the inventions to such systems.

Also the detailed explanations given in the Technical Background section above are intended to better understand the mostly 3GPP specific exemplary embodiments described herein and should not be understood as limiting the invention to the described specific implementations of processes and functions in the mobile communication network. Nevertheless, the improvements proposed herein may be readily applied in the architectures described in the Technical Background section. Furthermore the concept of the invention may be also readily used in the LTE RAN currently discussed by the 3GPP.

The invention claimed is:

1. An integrated circuit configured to control a process of a receiving entity, the integrated circuit comprising circuitry which, in operation:
   receives control information in one or more of multiple control information formats, from a transmitting entity, via a physical control channel that is mapped to resource elements, and
   detects the physical control channel on the resource elements,
   wherein the physical control channel is formed of a number of coded control information bits, the number being a defined integer multiple of a smallest number of coded control information bits that is associated with one of said multiple control information formats wherein at least two of the multiple control information formats are associated with different numbers of information bits, and wherein the defined integer multiple of the smallest number of coded control information bits corresponds to an aggregation of multiple resource elements.

2. The integrated circuit according to claim 1, wherein the circuitry, in operation, detects the physical control channel on a subset of resource elements on which the control information can be mapped.

3. The integrated circuit according to claim 2, wherein the circuitry, in operation, detects the physical control channel in a subset of the multiple control information formats.

4. The integrated circuit according to claim 3, wherein the subset of the multiple control information formats is configured to indicate a MIMO transmission mode of data transmission.

5. The integrated circuit according to claim 1, wherein the circuitry, in operation, detects the physical control channel in a subset of the multiple control information formats.

6. The integrated circuit according to claim 5, wherein the subset of the multiple control information formats is configured to indicate a MIMO transmission mode of data transmission.

7. The integrated circuit according to claim 1, wherein the circuitry, in operation, detects the physical control channel on a subset of resource elements that is configured by dedicated control information transmitted from the transmitting entity.

8. The integrated circuit according to claim 1, wherein the circuitry, in operation, detects the physical control channel on a subset of resource elements that is configured by common control information transmitted from the transmitting entity.

9. The integrated circuit according to claim 1, wherein the circuitry, in operation, detects the physical control channel on a subset of resource elements that is dynamically configured per sub-frame.

10. The integrated circuit according to claim 1, wherein the receiving entity is a user equipment (UE).

11. The integrated circuit according to claim 1, wherein the transmitting entity is a base station.

* * * * *